United States Patent [19]
Morimoto et al.

[11] Patent Number: 5,841,941
[45] Date of Patent: Nov. 24, 1998

[54] ENCODED DATA STREAM RECORDING AND REPRODUCING APPARATUS WITH TAPE SPEED, CHANNEL NUMBER, AND CYLINDER SPEED CONTROL IN ACCORDANCE WITH BIT RATE

[75] Inventors: Kenji Morimoto, Neyagawa; Tadashi Kunihira, Osaka; Akihiro Takeuchi, Nara; Yasuo Hamamoto, Higashiosaka; Masazumi Yamada, Moriguchi; Mutsuyuki Okayama, Katano; Atsuo Ochi, Moriguchi; Masaaki Kobayashi, Kawanishi; Akira Iketani, Higashiosaka, all of Japan

[73] Assignee: Matsushita Electric Indstrial Co., Ltd., Osaka, Japan

[21] Appl. No.: 513,485

[22] Filed: Aug. 10, 1995

[30]        Foreign Application Priority Data

| Aug. 10, 1994 | [JP] | Japan | 6-188397 |
| Oct. 31, 1994 | [JP] | Japan | 6-267171 |
| Dec. 14, 1994 | [JP] | Japan | 6-309358 |
| Feb. 22, 1995 | [JP] | Japan | 7-033773 |
| Feb. 22, 1995 | [JP] | Japan | 7-033779 |

[51] Int. Cl.⁶ ............................................. H04N 5/765
[52] U.S. Cl. .......................... 386/95; 386/124; 386/104; 386/108
[58] Field of Search .............................. 386/33, 35, 40, 386/46, 108, 111, 104, 112, 109, 122, 123, 124, 95; 360/32, 48; H04N 5/76, 5/92, 5/765, 5/775

[56]                References Cited

U.S. PATENT DOCUMENTS

| 4,456,930 | 6/1984 | Hashimoto . |
| 5,065,259 | 11/1991 | Kubota et al. .............................. 360/32 |
| 5,214,506 | 5/1993 | Lin et al. . |
| 5,282,049 | 1/1994 | Hatakenaka et al. . |
| 5,311,373 | 5/1994 | Murabayashi et al. .................. 386/123 |
| 5,323,188 | 6/1994 | Kawayachi et al. . |
| 5,329,375 | 7/1994 | Juri et al. . |
| 5,398,143 | 3/1995 | Strolle et al. . |
| 5,673,154 | 9/1997 | Arai et al. .................................. 386/33 |

FOREIGN PATENT DOCUMENTS

| 0 207 774 | 1/1987 | European Pat. Off. . |
| 0 228 240 | 7/1987 | European Pat. Off. . |
| 0 251 626 | 1/1988 | European Pat. Off. . |
| 0 510 975 | 10/1992 | European Pat. Off. . |
| 0 579 156 | 1/1994 | European Pat. Off. . |
| 0 593 214 | 4/1994 | European Pat. Off. . |
| 0 620 683 | 10/1994 | European Pat. Off. . |
| 0 630 155 | 12/1994 | European Pat. Off. . |
| 0 649 136 | 4/1995 | European Pat. Off. . |
| 0 673 157 | 9/1995 | European Pat. Off. . |
| 1-314080 | 12/1989 | Japan . |
| 6-275024 | 9/1994 | Japan . |
| 94/17631 | 8/1994 | WIPO . |

*Primary Examiner*—Thai Tran
*Attorney, Agent, or Firm*—Ratner & Prestia

[57]                ABSTRACT

A recording and reproducing apparatus for an input encoded data stream having two different bit rates $N_1$ and $N_2$, where $N_1 < N_2$. The recording and reproducing apparatus includes: an input interface for outputting the input encoded data stream to two channels; recording processors, connected to the outputs of the input interface, for converting the input encoded data stream into a signal suitable for writing onto a magnetic tape by a recording head; a tape speed controller for varying the speed of the magnetic tape in accordance with the bit rates of the input encoded data stream; a reproducing head for reading the signal from the magnetic tape; reproducing processors for processing a reproduced signal; and an output interface. The input interface divides and outputs the input encoded data stream to both of the two channels when the bit rate of the input encoded data stream is $N_2$, while the input interface outputs the input encoded data stream to only one of the two channels when the bit rate of the input encoded data stream is $N_1$. The output interface integrates and outputs the input signals from the two channels when the bit rate of the reproduced encoded data stream is $N_2$, while the output interface outputs the input signal from only one of the two channels when the bit rate of the reproduced encoded data stream is $N_1$.

6 Claims, 27 Drawing Sheets

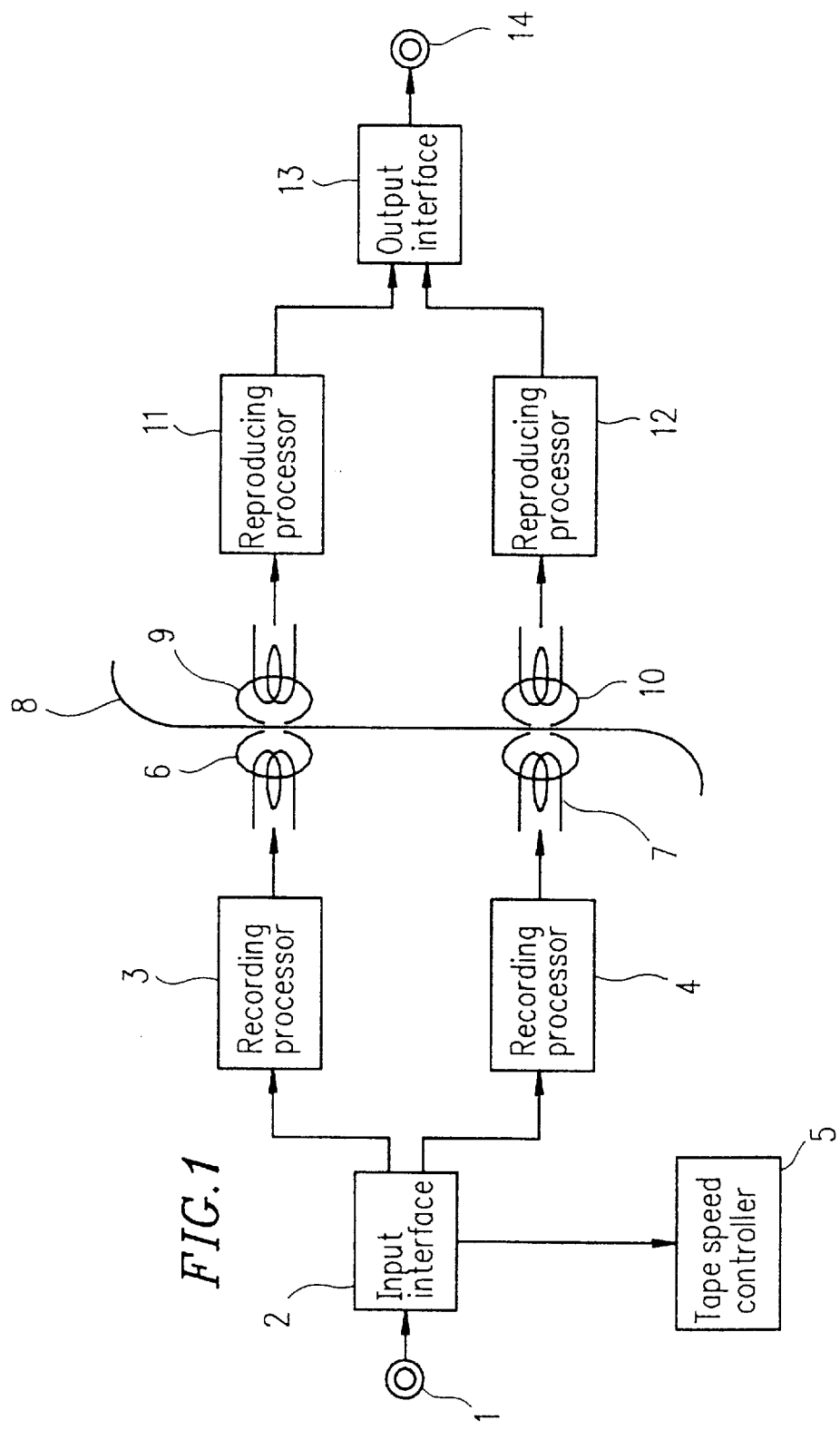

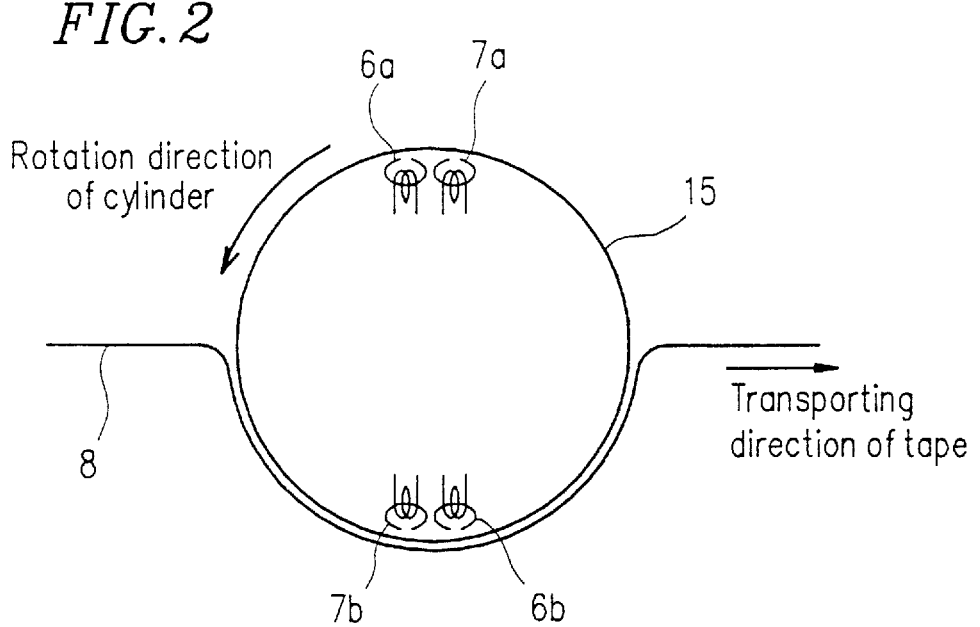

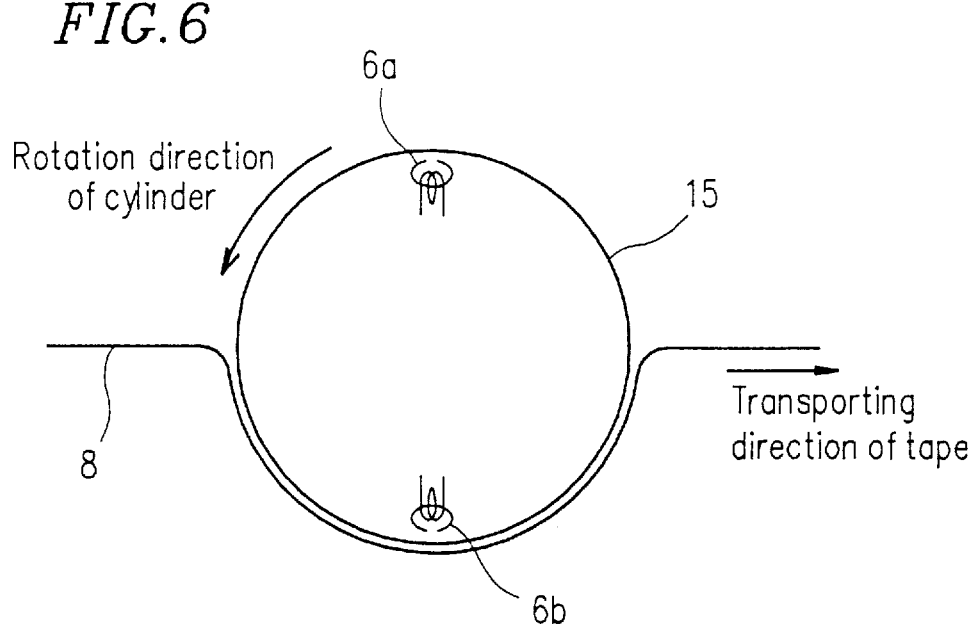

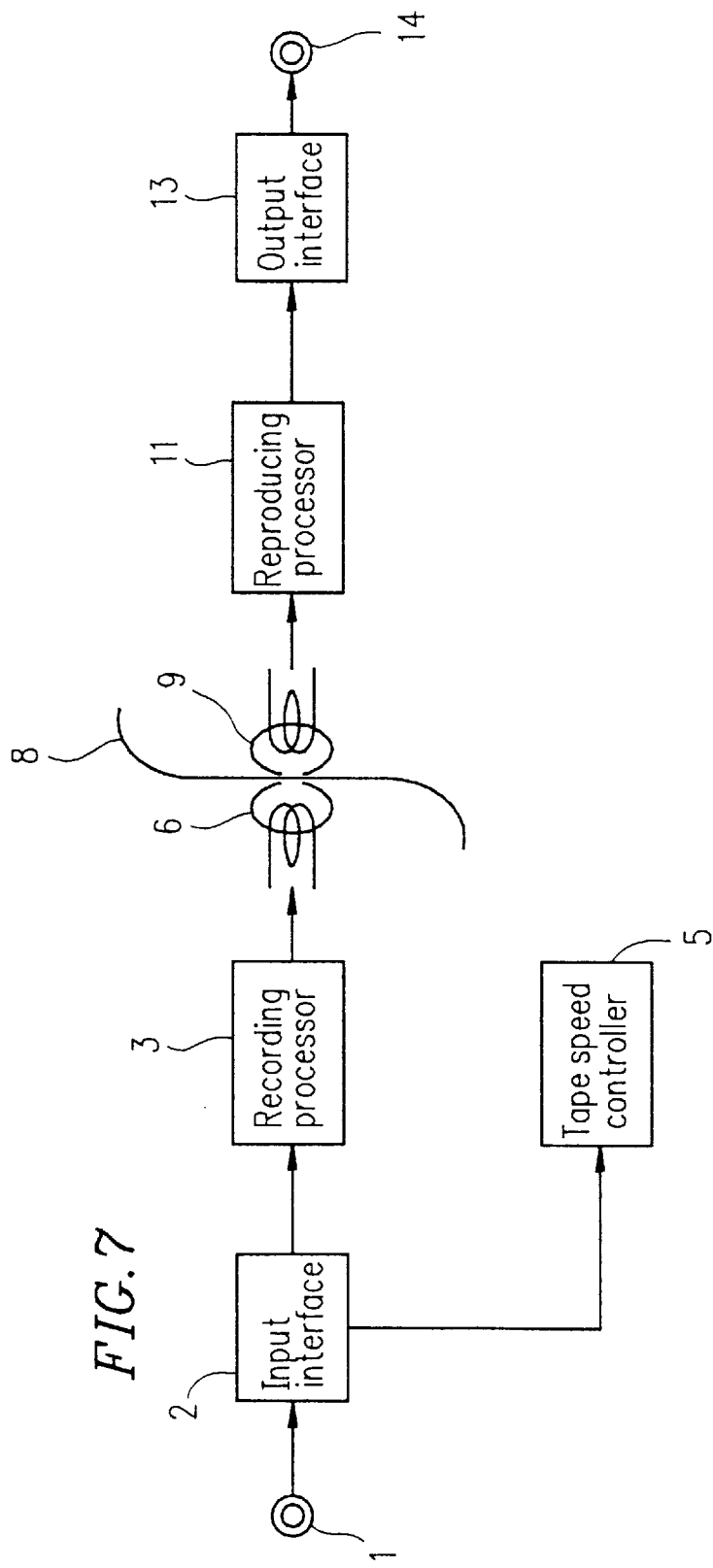

ENCODED DATA STREAM RECORDING AND REPRODUCING APPARATUS WITH TAPE SPEED, CHANNEL NUMBER, AND CYLINDER SPEED CONTROL IN ACCORDANCE WITH BIT RATE

BACKGROUND OF THE INVENTION

1. Field of the Invention

The present invention relates to an input encoded data stream recording and reproducing apparatus. More specifically, the present invention relates to an input encoded data stream recording and reproducing apparatus for correcting a reproduced data where an error has been generated, and a recording and reproducing apparatus allowing for reproducing a trick play video of satisfactory quality.

2. Description of the Related Art

Nowadays, a multi-channel satellite broadcasting service is available in the United States. Such a multi-channel satellite broadcasting is realized by considerably compressing a video signal or an audio signal by utilizing digital compression technologies. In the multi-channel satellite broadcasting, the bit rate for the channel to be transmitted is varied in accordance with the contents of the program to be broadcast and the like. For example, in the case of broadcasting a movie or the like, the bit rate for the channel is set to be low, e.g., 3 Mbps, while in the case of broadcasting a live video or the like, the bit rate for the channel is set to be high, e.g., 6 Mbps. A similar service based on conventional technologies utilizing a ground wave, a communication satellite, a cable network and the like is going to be available in the near future in Japan and Europe, too.

In other words, such a multi-channel broadcasting is on the point of being put into practice by reducing the communication cost for each channel by utilizing the newest digital compression technologies.

On the other hand, the introduction of the digital technologies into a recording and reproducing apparatus has remarkably been developed these days. As a result, several kinds of recording and reproducing apparatuses allowing for a digital recording are practically used now. In a digitally recording type recording and reproducing apparatus for performing a helical recording on a tape-shaped recording medium, in order to perform a high-speed reproduction by transporting the tape-shaped recording medium at a faster speed as compared with the speed for a normal reproduction, the data for the high-speed reproduction is repeatedly recorded in the high-speed reproduction regions on the tape-shaped recording medium several times. According to such a method, it is possible to stably perform the high-speed reproduction by simplifying the control of the heads and the magnetic tape during the high-speed reproduction.

Since the above-mentioned service was begun, currently available video tape recorders (VTRs) for a home-use, e.g., VTRs of VHS, S-VHS, and 8 mm, record an analog video signal obtained by decoding the received digital signal. Accordingly, it is impossible to vary the recording time period in accordance with the bit rate of the input encoded data stream. For example, the recording time period required in the case of receiving a broadcasting at a bit rate of 3 Mbps does not become twice as long as that required in the case of receiving a broadcasting at a bit rate of 6 Mbps, but becomes the same length as in a 6 Mbps. In addition, although a large number of programs are simultaneously broadcast by the above-mentioned service, it is still impossible to simultaneously record a plurality of programs by using one and the same VTR.

The problem lies in the method for recording the digital data in conventional VTRs. More specifically, although the digital data, obtained by converting an analog video signal, an analog audio signal or the like, is transmitted after compressing the digital data so as to have the bit rate reduced as described above, the conventional VTRs record an analog video signal or an analog audio signal obtained by decoding the transmitted digital data, not the digital data itself.

SUMMARY OF THE INVENTION

According to an aspect of the present invention, a recording and reproducing apparatus for an input encoded data stream having two different bit rates of $N_1$ and $N_2$ (where $N_1 < N_2$) is provided. The recording and reproducing apparatus includes: an input interface having two outputs for outputting the input encoded data stream to two channels, the input interface dividing and outputting the input encoded data stream to both of the two channels when the bit rate of the input encoded data stream is $N_2$, while the input interface outputting the input encoded data stream to only one of the two channels when the bit rate of the input encoded data stream is $N_1$; a first recording processor and a second recording processor for converting the input encoded data stream into a signal suitable for being recorded so as to supply the signal to a recording head, the first recording processor and the second recording processor being connected with the two outputs of the input interface; a recording head for writing the signal onto a magnetic tape; a tape speed controller for varying a speed for transporting the magnetic tape in accordance with the bit rates of the input encoded data stream; a reproducing head for reading the signal from the magnetic tape; a first reproducing processor and a second reproducing processor for performing a predetermined reproduction processing for a signal reproduced from the reproducing head; and an output interface having two inputs for inputting the signals from two channels, the input interface integrating and outputting the signals input from the two channels when the bit rate of the reproduced encoded data stream is $N_2$, while the output interface outputting the signal input from only one of the two channels when the bit rate of the reproduced encoded data stream is $N_1$. In the recording and reproducing apparatus, the speed for transporting the magnetic tape and a number of the channels used for recording and reproducing operations are varied in accordance with the bit rates of the input encoded data stream.

In one embodiment, the recording and reproducing apparatus for an encoded data stream includes: an input terminal for inputting an analog video signal; an output terminal for outputting the analog video signal; an analog recording processor for processing the analog video signal so as to record the analog video signal onto the magnetic tape; and an analog reproducing processor for processing the analog video signal so as to reproduce the analog video signal from the magnetic tape. In the recording and reproducing apparatus, a rotation speed of a cylinder, on which the recording head and the reproducing head are mounted, is not varied in both cases of recording the analog video signal and the encoded data stream.

According to the aspect of the present invention, an error correction apparatus for the recording and reproducing apparatus for an encoded data stream is provided. The recording and reproducing apparatus or the reproducing apparatus includes: an error detection means for detecting an error from a reproduced signal and outputting error detection information when the error is detected; a refresh information detection means for outputting a refresh information signal indicating a timing of a refresh performed in a differential pulse coding from a reproduced signal; and a correction means for generating a signal in a refresh period during which no error is generated from the reproduced signal by using a signal output from the error detection means and the signal output from the refresh information detection means so as to substitute the signal in the refresh period during which no error is generated for the signal in a refresh period during which the error is generated.

In one embodiment, the recording and reproducing apparatus or the reproducing apparatus further includes: a memory means for storing the reproduced signal; and a controller for controlling the memory means so that a signal in a refresh period during which no error is generated is output in place of the signal in a refresh period during which an error is generated, by using the output from the error detection means and the output from the refresh information detection means.

In another embodiment, the recording and reproducing apparatus or the reproducing apparatus further includes: a data bit number converter for converting a bit number of the signal in a refresh period during which no error is generated into a bit number of the signal in a refresh period during which an error is generated, by using the signal output from the memory means as an input.

According to another aspect of the present invention, a recording and reproducing apparatus for an input encoded data stream having two different bit rates of $N_1$ and $N_2$ (where $N_1<N_2$) is provided. The recording and reproducing apparatus includes: an input interface for detecting the bit rate of the input encoded data stream; a recording processor for converting the input encoded data stream into a signal suitable for being recorded so as to supply the signal to a recording head, the recording processor being connected with an output of the input interface; a recording head for writing the signal onto a magnetic tape; a tape speed controller for varying a speed for transporting the magnetic tape in accordance with the bit rates of the input encoded data stream; a cylinder controller for varying a rotation speed of a cylinder in accordance with the bit rates of the input encoded data stream; a reproducing head for reading the signal from the magnetic tape; a reproducing processor for performing a predetermined reproduction processing for a signal reproduced from the reproducing head; and an output interface for outputting a signal so as to restore the input encoded data stream from the signal. In the recording and reproducing apparatus, the speed for transporting the magnetic tape and the rotation speed of the cylinder are varied in accordance with the bit rates of the input encoded data stream.

According to still another aspect of the present invention, a recording and reproducing apparatus for an input encoded data stream having two different bit rates of $N_1$ and $N_2$ (where $N_1<N_2$) is provided. The recording and reproducing apparatus includes: an input interface for detecting the bit rate of the input encoded data stream; a recording processor for converting the input encoded data stream into a signal suitable for being recorded so as to supply the signal to a recording head, the recording processor being connected with an output of the input interface; a recording head for writing the signal onto a magnetic tape; a tape speed controller for varying a speed for transporting the magnetic tape in accordance with the bit rates of the input encoded data stream; a reproducing head for reading the signal from the magnetic tape; a reproducing processor for performing a predetermined reproduction processing for a signal reproduced from the reproducing head; and an output interface for outputting a signal so as to restore the input encoded data stream from the signal. In the recording and reproducing apparatus, only the speed for transporting the magnetic tape is varied in accordance with the bit rates of the input encoded data stream.

According to still another aspect of the present invention, a recording apparatus for an encoded data stream to be input on a packet basis for dividing at least one transport packet into at least two recording blocks so as to record the divided recording blocks is provided. The recording apparatus includes: a unit information generating means for generating a unit information signal having different bits in adjacent units, the unit information signal indicating a unit for a recording block aligned with the transport packet; a recording block formatter means for converting the transport packet into the recording block and inserting the unit information signal output from the unit information generating means into the recording block; a recording processing means for converting a signal output from the recording block formatter means into a signal suitable for being recorded; and a recording means for recording a signal output from the recording processing means onto a recording medium.

According to still another aspect of the present invention, a reproducing apparatus for an encoded data stream is provided. The reproducing apparatus includes: an extraction means for extracting a signal from the recording medium; a reproduced signal processing means for decoding a signal output from the extraction means in a form equivalent to a form of an output from the recording block formatter means during a recording operation; a unit information detection means for detecting the unit information signal from a signal output from the reproduced signal processing means; and a transport packetizing means for detecting an alignment position between the transport packet of the signal output from the reproduced signal processing means and the recording block based on the unit information signal detected by the unit information detection means so as to generate the transport packet from the recording block.

In one embodiment, the reproducing apparatus for an encoded data stream includes: a counting means for counting a number of the recording blocks in the unit based on the signal output from the reproduced signal processing means; and a transport packetizing means for detecting an alignment position between the transport packet and the recording block by using a signal output from the counting means so as to generate the transport packet from the recording block in a case of determining that a successive number of the same values of the signal output from the unit information detection means exceeds a number of the recording blocks in the unit based on the signal output from the counting means.

According to still another aspect of the present invention, a recording and reproducing apparatus for an encoded data stream is provided. The recording and reproducing apparatus includes: a high-speed reproduction coding means for coding an input encoded data stream as a data for a high-speed reproduction; a format means for changing an order of the data for the high-speed reproduction so as to record the encoded data onto two kinds of high-speed reproduction data regions which are obtained by dividing a recording track into two kind regions for a normal reproduction and for a high-speed reproduction, the high-speed reproduction data regions consisting of high-speed reproduction data regions A provided every other track and high-speed reproduction data regions B provided every N (a natural number) tracks, so that the same data A for the high-speed reproduction is repeatedly recorded in the high-speed reproduction data regions A at $n_a$ times and that the same data B for the high-speed reproduction is repeatedly recorded in the high-speed reproduction data regions B at $n_b$ times; and a recording means for recording a data output from the format means on a recording medium.

In one embodiment, the data A for the high-speed reproduction is recorded and reproduced onto/from tracks having the same azimuth, and the data B for the high-speed reproduction is recorded and reproduced onto/from tracks having different azimuth from the azimuth of the tracks.

In another embodiment, the data A for the high-speed reproduction is recorded and reproduced onto/from tracks having the same azimuth, and the data B for the high-speed reproduction is recorded and reproduced onto/from tracks having the same azimuth as the azimuth of the tracks.

In still another embodiment, the high-speed reproduction data regions B are formed on one and the same track.

In still another embodiment, the data in the high-speed reproduction data regions B provided every N tracks are reproduced by controlling a phase of a head scanning during performing a high-speed reproduction.

In still another embodiment, the natural number N is six.

According to still another aspect of the present invention, a recording and reproducing apparatus for recording and reproducing an encoded data stream on a screen where a number of transport bits is reduced by using a data on one screen or by eliminating a correlation between the screens at different time points is provided. In the recording and reproducing apparatus, the encoded data stream is reproduced both on the screen where the number of transport bits is reduced by using the data of the encoded data stream on one screen and on the screen where the number of transport bits is reduced by eliminating the correlation between the screens at different time points during performing the reproduction at a positive speed, and the encoded data stream is reproduced on the screen where the number of transport bits is reduced by using the encoded data stream on one screen during performing the reproduction at a negative speed.

In one embodiment, the encoded data stream is reproduced by using at least two kinds of bit streams including a bit stream for normal reproduction and a bit stream for a high-speed reproduction which are selected in accordance with a reproduction speed.

In another embodiment, a signal is reproduced by helically winding a tape-shaped recording medium around a cylinder on which a reproducing head is mounted.

In still another embodiment, the recording and reproducing apparatus includes: an input terminal for inputting a bit stream obtained by multiplexing the bit stream for normal reproduction and the bit stream for the high-speed reproduction; and a dividing means for dividing the multiplexed bit stream into the bit stream for normal reproduction and the bit stream for the high-speed reproduction.

In still another embodiment, the recording and reproducing apparatus includes at least two kinds of bit stream input terminals including an input terminal for inputting the bit stream for normal reproduction and an input terminal for inputting the bit stream for the high-speed reproduction.

According to still another aspect of the present invention, a reproducing apparatus for reproducing an encoded data stream on a screen where a number of transport bits is reduced by using a data on one screen or by eliminating a correlation between the screens at different time points is provided. In the reproducing apparatus, the encoded data stream is reproduced both on the screen where the number of transport bits is reduced by using the data of the encoded data stream on one screen and on the screen where the number of transport bits is reduced by eliminating the correlation between the screens at different time points during performing the reproduction at a positive speed, and the encoded data stream is reproduced on the screen where the number of transport bits is reduced by using the encoded data stream on one screen during performing the reproduction at a negative speed.

In one embodiment, the reproducing apparatus includes: an input terminal for inputting a bit stream obtained by multiplexing the bit stream for normal reproduction and the bit stream for the high-speed reproduction; and a dividing means for dividing the multiplexed bit stream into the bit stream for normal reproduction and the bit stream for the high-speed reproduction.

In another embodiment, the recording and reproducing apparatus includes at least two kinds of bit stream input terminals including an input terminal for inputting the bit stream for normal reproduction and an input terminal for inputting the bit stream for the high-speed reproduction.

In order to solve the above-mentioned problems, an encoded data stream recording and reproducing apparatus of the invention includes a plurality of recording processors and reproducing processors so as to vary the tape transporting speed and the number of the channels to be used for the recording and reproducing operations in accordance with the bit rate of the input encoded data stream.

The recording and reproducing apparatus of the present invention having the above-described configuration performs the recording and reproducing operations by using recording and reproducing processors for one channel in the case where the bit rate of the input encoded data stream is low, and using recording and reproducing processors for multiple channels while varying the tape transporting speed in the case where the bit rate of the input encoded data stream is high.

In other words, the recording and reproducing apparatus of the present invention realizes highly efficient recording and reproducing operations by varying the amount of the consumed tape in accordance with the bit rate of the input encoded data stream.

In addition, the recording and reproducing apparatus of the present invention can also record and reproduce plural kinds of encoded data with a low bit rate by using the recording and reproducing processors for multiple channels.

Furthermore, the recording and reproducing apparatus of the present invention can also record and reproduce the data while maintaining the data in the state of a digital signal, so that the quality of the video is hardly degraded unlike currently available. VTRs for recording and reproducing the data after decoding the digital signal into an analog signal.

Thus, the invention described herein makes possible the advantage of providing a VTR allowing for recording a data for a long time period in the case where a program with a low bit rate is input, and simultaneously recording a plurality of programs.

This and other advantages of the present invention will become apparent to those skilled in the art upon reading and understanding the following detailed description with reference to the accompanying figures.

BRIEF DESCRIPTION OF THE DRAWINGS

FIG. 1 is a block diagram schematically showing a configuration of an encoded data stream recording and reproducing apparatus according to an example of the present invention.

FIG. 2 shows a configuration of a cylinder for the recording and reproducing apparatus according to the example of the present invention.

FIG. 6 shows a configuration of a cylinder for the recording and reproducing apparatus according to the third example of the present invention.

FIG. 7 is a block diagram schematically showing a configuration of an encoded data stream recording and reproducing apparatus according to a fourth example of the present invention.

DESCRIPTION OF THE PREFERRED EMBODIMENTS

Figure 3A:
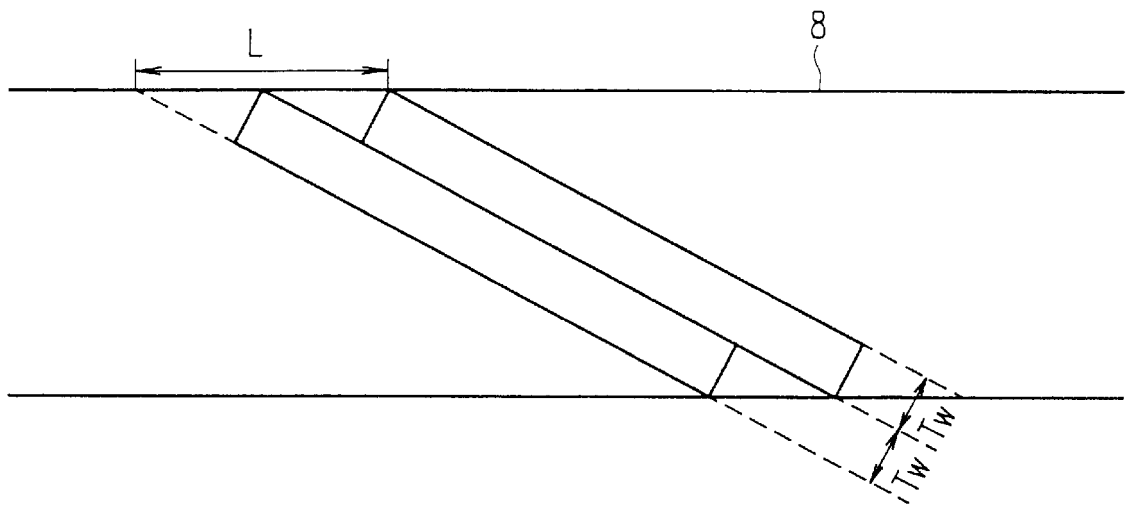
FIGS. 3A and 3B show recording track patterns in the recording and reproducing apparatus according to the example of the present invention.

Hereinafter, an encoded data stream recording and reproducing apparatus according to the present invention will be described by way of illustrative examples with reference to accompanying drawings. The same reference numerals denote the same components throughout the drawings. It is noted that a "recording and reproducing apparatus" refers to an "encoded data stream recording and reproducing apparatus".

EXAMPLE 1

FIG. 1 is a block diagram schematically showing a configuration of a recording and reproducing apparatus according to an example of the present invention. An input terminal 1 receives an encoded data stream. An input interface 2 detects a bit rate of the input data stream so as to distribute and output the data stream to two channels in accordance with the detected bit rate of the data stream. Recording processors 3 and 4 convert the two divided data streams into a signal suitable for being recorded on a magnetic tape. A tape speed controller 5 varies the speed for transporting a magnetic tape 8 in accordance with the detected bit rate of the data stream. Recording heads 6 and 7 record the signals output from the recording processors 3 and 4 onto the magnetic tape 8, respectively. Reproducing heads 9 and 10 reproduce and output the signal recorded by the recording heads 6 and 7 from the magnetic tape 8. Reproducing processors 11 and 12 receive the signals output from the reproducing heads 9 and 10, process the signals in a predetermined manner, and output the processed signals. An output interface 13 receives the signals output from the reproducing processors 11 and 12, restores the signals into the same encoded data stream as the recorded one and outputs the restored data stream to an output terminal 14.

In FIG. 1, the recording processor 3, the recording head 6, the reproducing head 9 and the reproducing processor 11 will be regarded as a first channel and the recording processor 4, the recording head 7, the reproducing head 10 and the reproducing processor 12 will be regarded as a second channel. Both bit rates of the encoded data streams to be recorded and reproduced by using the first and the second channels will be assumed to be N Mbps.

FIG. 2 schematically shows a configuration of the heads to be used for the recording and reproducing operations. As shown in FIG. 2, the heads 6a, 6b, 7a and 7b are mounted on a cylinder 15. The heads 6a and 6b are used for the recording and reproducing operations performed by the first channel, while the heads 7a and 7b are used for the recording and reproducing operations performed by the second channel.

Hereinafter, the operation of the recording and reproducing apparatus having the above-described configuration will be described as being applied to the case where encoded data streams with two kinds of bit rates, i.e., N Mbps and 2N Mbps, are input to the input terminal 1. The input interface 2 outputs the data stream only to the first channel when the bit rate of the input encoded data stream is N Mbps, and outputs the data stream to both the first and the second channels when the bit rate of the input encoded data stream is 2N Mbps.

First, the case where the data stream with the bit rate of N Mbps is input will be described. The input interface 2 detects the bit rate of the data stream to be N Mbps. Based on the detected bit rate, the input interface 2 outputs the encoded data stream only to the recording processor 3. The recording processor 3 processes the input encoded data stream so as to record the data stream on the magnetic tape 8. For example, the processings include: an encoding using an error correction code (ECC); an addition of a sync (synchronization) data and an ID data; a modulation; a recording equalization; and a recording amplification. The processed signal is recorded on the magnetic tape 8 by the recording head 6. In this case, the recording processor 4 is not required to operate and the recording head 7 is not required to record the signal, either. In other words, the data stream can be recorded and reproduced by using only the first channel.

FIG. 3A shows the pattern of the track recorded on the magnetic tape 8 when the recording and reproducing operations are performed by using only the first channel. In performing the recording operation, two recorded tracks are formed by the recording heads 6a and 6b during one rotation of the cylinder 15. In performing the reproducing operation, the signal reproduced by the reproducing head 9 is subjected to the predetermined processings, e.g., the detection and the protection of the sync data and the ID data, an ECC decoding and the like by the reproducing processor 11. The output interface 13 restores an encoded data stream complying with a predetermined standard from the reproduced data stream so as to output the restored data stream. In this example, the recording and reproducing operations are assumed to be performed by using only the first channel. However, the same operations can be performed by using the second channel only instead of the first channel.

Next, the case where the encoded data stream with a bit rate of 2N Mbps is input will be described. The input interface 2 detects the bit rate of the data stream to be 2N Mbps. Based on the detected bit rate, the input interface 2 distributes the input encoded data stream to two channels and outputs the divided data streams to both the recording processors 3 and 4. As described above, the recording processors 3 and 4 process the data stream so as to record the data stream onto the magnetic tape 8. The processed signal is recorded on the magnetic tape 8 by the recording heads 6 and 7.

Figure 3B:
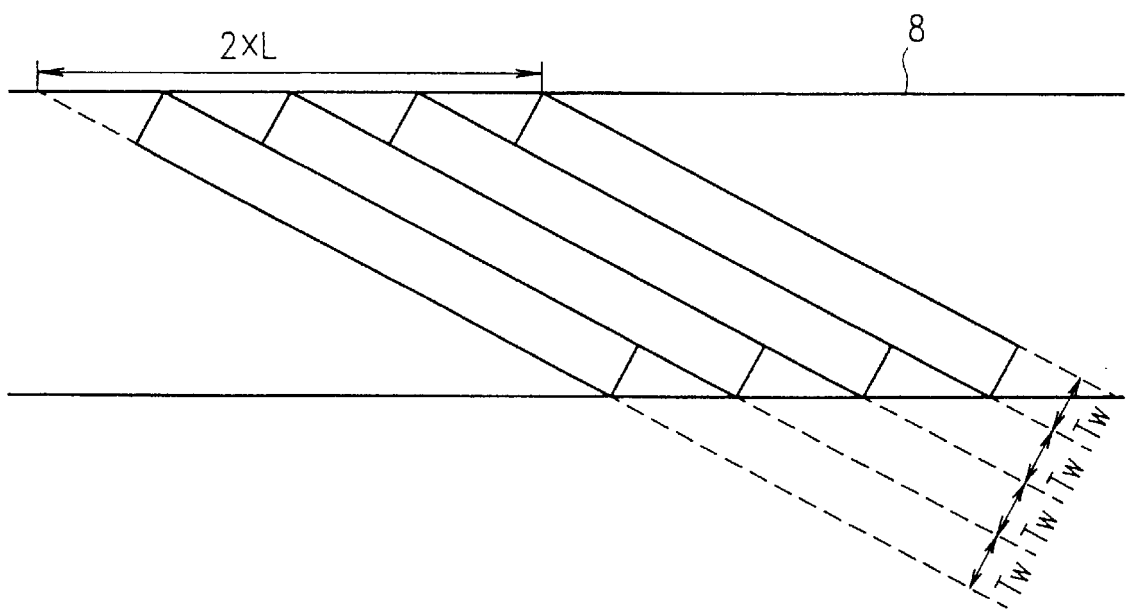

FIG. 3B shows the pattern of the track recorded on the magnetic tape 8 when the recording and reproducing operations are performed by using both the first and the second channels. Since the bit rate of the input data stream is 2N Mbps, the tape speed controller 5 transports the tape at a speed twice as fast as the speed when the bit rate is N Mbps. The rotation speed of the cylinder 15 is the same as that in the case where the bit rate of the data stream is N Mbps. In performing the recording operation, four recorded tracks are formed by the recording heads 6a, 6b, 7a and 7b during one rotation of the cylinder 15. In this case, the width of each of the four tracks is the same as the width $T_W$ in the case of recording by using only the first channel. If the transportation distance of the tape per unit time period is denoted by L in the case where the bit rate of the encoded data stream is N Mbps, then the transportation distance of the tape per unit time period is denoted by 2 L in the case where the bit rate of the encoded data stream is 2N Mbps. In performing the reproducing operation, the predetermined reproducing processings to be performed for the first channel only when the bit rate is N Mbps are performed with respect to both the first and the second channels. The output interface integrates and outputs the encoded data streams output from the two channels into one data stream.

As described above, the recording and reproducing apparatus of the present invention makes it possible to record and reproduce both a data stream with a bit rate and a data stream with a bit rate twice as high as the bit rate by selecting the number of the channels to be used.

In the foregoing description, in order to record and reproduce the encoded data stream by using the first channel only, the bit rate of the input encoded data stream is set to be N Mbps. It is obvious that the same operations can be performed for the case where an encoded data stream with a bit rate lower than N Mbps is input.

In this first example, the two kinds of bit rates of the encoded data stream to be recorded and reproduced are set to be N Mbps and 2N Mbps. However, the ratio of the two kinds of bit rates is not limited to two. Even when the ratio is larger than two, or in a range of one to two, the same operations can be performed by selecting the number of the channels to be used for the recording and reproducing operations.

In this example, the recording and reproducing apparatus has a configuration where the recording heads and the reproducing heads are separately provided. Alternatively, a recording and reproducing apparatus including a head functioning both as a recording head and a reproducing head can also be used. In addition, the recording medium is not limited to a magnetic tape. The recording medium may also be a hard disk, a semiconductor memory or the like.

EXAMPLE 2

Figure 4:
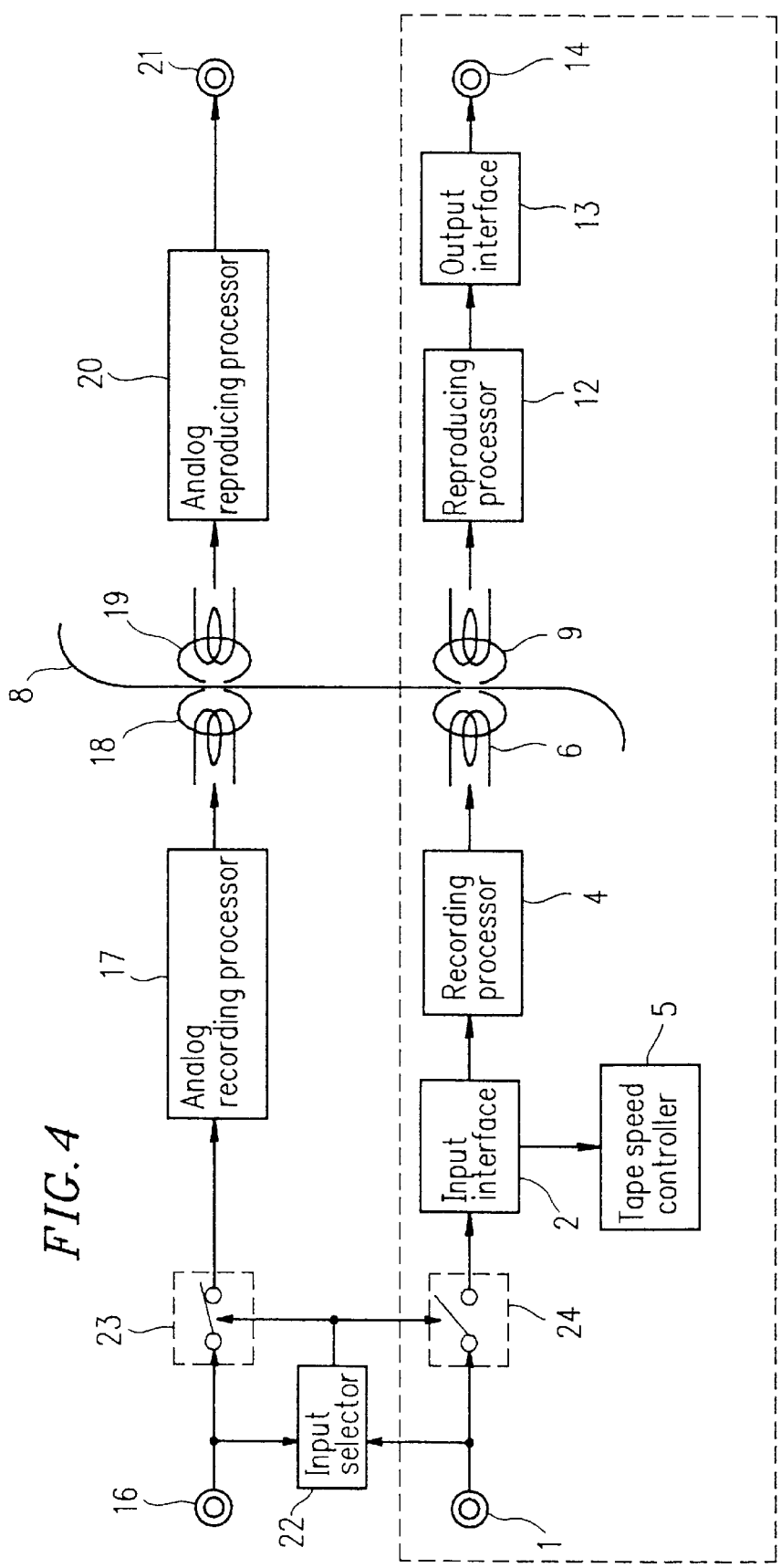
FIG. 4 is a block diagram schematically showing a configuration of an encoded data stream recording and reproducing apparatus according to a second example of the present invention.

FIG. 4 is a block diagram schematically showing a configuration of a recording and reproducing apparatus according to a second example of the present invention. An input terminal 16 receives an analog video signal. An analog recording processor 17 processes the received analog video signal so as to perform analog recording of the analog video signal on a magnetic tape 8. A recording head 18 records the processed analog video signal on the magnetic tape 8. A reproducing head 19 reproduces the analog video signal from the magnetic tape 8. An analog reproducing processor 20 reproduces an analog video signal from the signal output from the reproducing head 19. The reproduced analog video signal is output from an output terminal 21.

An input selector 22 closes one of a first switch 23 and a second switch 24 by determining whether an analog video signal is input from the input terminal 16 or an encoded data stream is input from the input terminal 1.

If the first switch 23 is closed, then the recording of the analog video signal is performed. On the other hand, if the second switch 24 is closed, then the recording of the encoded data stream is performed. As has already been described with reference to FIG. 1, the section enclosed by the broken line in FIG. 4 is used for recording and reproducing the encoded data stream.

Referring to FIG. 4, the operation of the recording and reproducing apparatus according to the second example of the present invention will be described. In the case where an analog video signal is input, the input selector 22 closes the first switch 23, thereby recording the analog video signal. The analog recording processor 17 performs the processings required for recording the analog video signal on the magnetic tape 8. For example, such processings include: an emphasis, a clipping; an equalization; an FM modulation; and a recording amplification. The processed signal is supplied to the recording head 18. In the case of performing an analog recording operation using a VTR of a VHS system (diameter of a cylinder: 62 mm), the rotation speed of the cylinder is set to be 1800 rpm, for example.

In the case where an encoded data stream is input, the input selector 22 closes the second switch 24, thereby performing digital recording of the encoded data stream. In the case of performing a digital recording operation, the rotation speed of the cylinder is set to be equal to that for the analog recording operation. For example, if a VTR of a VHS system is used, the rotation speed of the cylinder is set to be 1800 rpm.

In general, in order to additionally provide the functions of recording and reproducing an encoded data stream for a currently available VTR for recording and reproducing an analog video signal, it is not preferable to vary the rotation speed of a cylinder. The reason is as follows. If the rotation speed of a cylinder is varied, then the conditions of the interface between a tape and a head are varied. In other words, it is difficult to maintain the contact between the tape and the head under a constant state.

In the recording and reproducing apparatus according to the second example of the present invention, by setting the rotation speed of the cylinder for the analog recording operation to be equal to, that for the digital recording operation, both an analog signal and a digital signal can be recorded without varying a specification of the VTR's operation.

In addition, in the case where both an analog video signal and an encoded data stream are simultaneously input, the switches 23 and 24 can be controlled so that the recording of the analog signal is given priority by the input selector 22. In such a case, when a magnetic tape to be exclusively used for the analog recording, not for the digital recording, is inserted into a VTR, the following operation mistake can be advantageously avoided: the digital recording is performed onto the magnetic tape exclusively for the analog recording, so that a normal recording is not done.

In this example, a head for recording an analog video signal and a head for recording an encoded data stream are separately provided. Alternatively, the analog video signal and the encoded data stream can be selected immediately before supplying the signal and the data stream to a recording head or a recording amplifier. In such a case, it is possible to use a head or a recording amplifier in common for recording the analog signal and the encoded data stream.

In the foregoing description, the encoded data stream is recorded and reproduced by using only one channel. Alternatively, the encoded data stream can be recorded and reproduced by using a plurality of channels.

EXAMPLE 3

Figure 5:
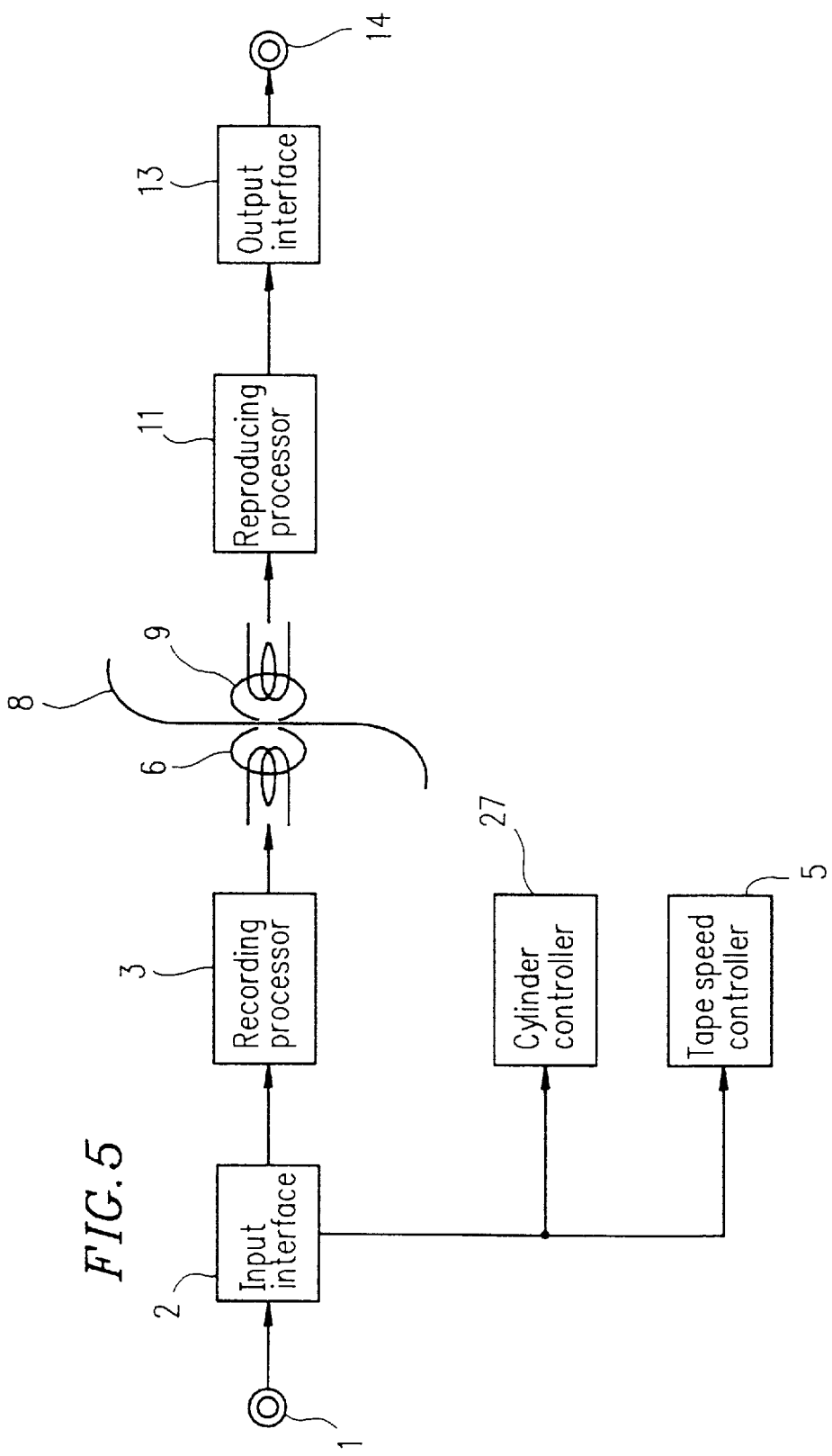
FIG. 5 is a block diagram schematically showing a configuration of an encoded data stream recording and reproducing apparatus according to a third example of the present invention.

FIG. 5 is a block diagram schematically showing a configuration of a recording and reproducing apparatus according to a third example of the present invention.

The recording and reproducing apparatus of this third example is different from the recording and reproducing apparatus of the first example shown in FIG. 1 in that only one channel is used for the recording and reproducing operations, and that a cylinder controller 27 is additionally provided for the recording and reproducing apparatus of the third example. In this example, the cylinder controller 27 varies the rotation speed of the cylinder in accordance with the bit rate of the input encoded data stream.

FIG. 6 shows the cylinder 15 provided with recording and reproducing heads 6a and 6b to be used in this example. The cylinder 15 on which the recording and reproducing heads 6a and 6b are mounted rotates at a first rotation speed M rpm when the bit rate of the input encoded data stream is N Mbps, and rotates at a second rotation speed 2M rpm when the bit rate of the input encoded data stream is 2N Mbps. When the bit rate of the data stream is doubled, the tape speed is also controlled to be doubled.

In this third example, in the case where the bit rate of the input encoded data stream is N Mbps, the resulting track pattern also becomes that shown in FIG. 3A, while in the case where the bit rate of the input encoded data stream is 2N Mbps, the resulting track pattern also becomes that shown in FIG. 3B. As shown in FIGS. 5 and 6, even when the bit rate of the input encoded data stream increases, the recording and reproducing apparatus of this third example can easily deal with the increase in the bit rate by accelerating the rotation speed of the cylinder.

In this example, the rotation speed of the cylinder is doubled in accordance with the increase in the bit rate of the input encoded data stream. However, the ratio is not limited to two. For example, in the case where an encoded data stream having a first bit rate $N_1$ and a second bit rate $N_2$ (where $N_1 < N_2$) is input, it is sufficient to set the ratio of the rotation speed of the cylinder to be $N_2/N_1$ with respect to the data stream having the two bit rates.

EXAMPLE 4

FIG. 7 is a block diagram schematically showing a configuration of a recording and reproducing apparatus according to a fourth example of the present invention.

The recording and reproducing apparatus of this fourth example is different from the recording and reproducing apparatus of the first example shown in FIG. 1 in that only one channel is used for the recording and reproducing operations, and that a tape speed controller 5 can vary a recording track pitch by varying the rotation speed of the cylinder in accordance with the bit rate of the input encoded data stream.

Figure 8A:
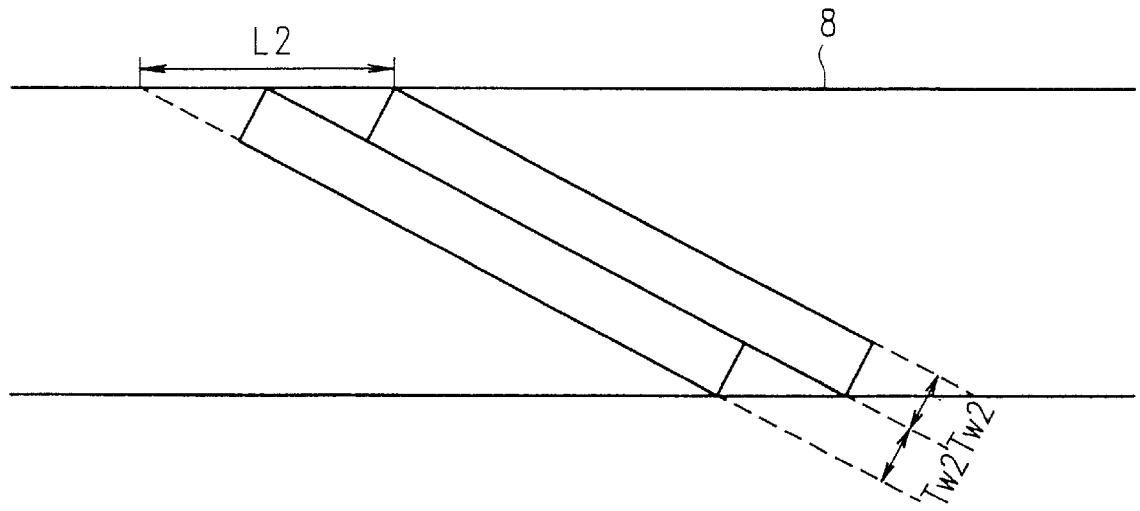
FIGS. 8A and 8B show recording track patterns in the recording and reproducing apparatus according to the fourth example of the present invention.

FIG. 8A shows a pattern of the track recorded by the recording head 6 in the case where the bit rate of the input encoded data stream is N Mbps. The pitch of the recorded track is Tw$_2$ (μm).

Figure 8B:
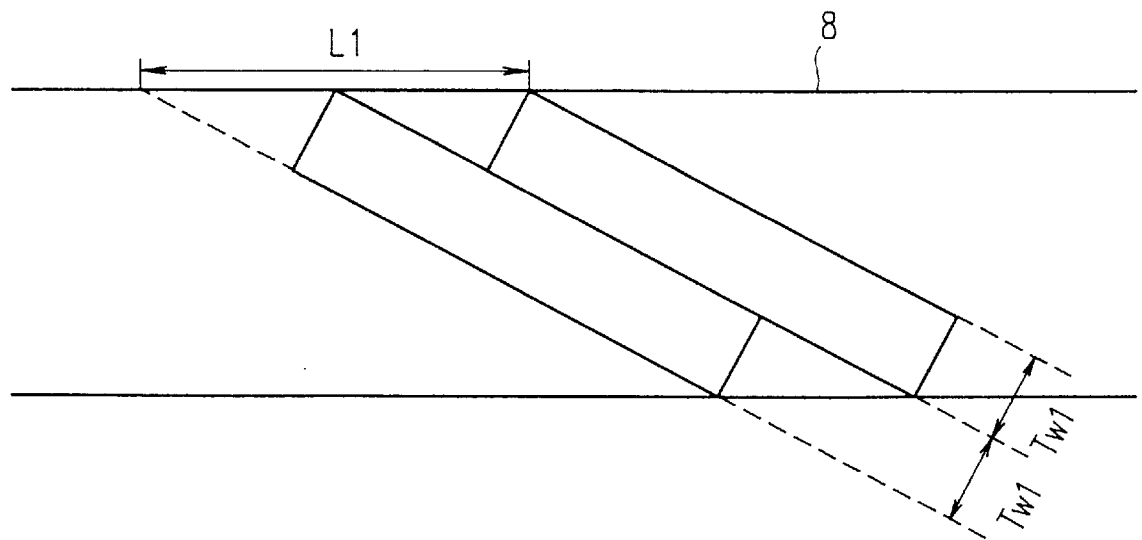

FIG. 8B shows a pattern of the track recorded by the recording head 6 in the case where the bit rate of the input encoded data stream is 2N Mbps. When the bit rate is 2N Mbps, the tape speed controller 5 controls so that the tape is transported at a faster speed as compared with the case where the bit rate is N Mbps. Accordingly, the pitch of the recorded track becomes wider as indicated by Tw$_1$ (μm) in FIG. 8B (where Tw$_2$<Tw$_1$). Since the pitch of the recorded track becomes wider, a carrier-to-noise ratio (CNR) of the reproduced signal can be improved and the degradation of the reproduced signal caused by the curvature of the recorded track or the like can be suppressed. As a result, a bit rate usable for the recording and reproducing operations can be increased. That is to say, by increasing the pitch of the recorded track as described above, the recording and reproducing apparatus of this fourth example can deal with a high bit rate of the input encoded data stream without increasing the number of the channels used for the recording and reproducing operations.

EXAMPLE 5

When a data stream including transport packets is recorded onto a magnetic medium, the data stream is recorded on a recording block basis. The recording blocks usually have different length from that of the transport packets. In this case, if the transport packets are arbitrarily combined into the recording blocks, one error in the recording block results in two errors in the reproduced transport packets in most cases. This is because almost each recording block comprises different transport packets.

In a recording and reproducing apparatus of the fifth example, a number M (e.g., M=2) of successive transport packets are recorded on a magnetic tape as a number N (e.g., N=3) of successive recording blocks. The number M of successive transport packets to be recorded in a number N of successive recording blocks will be herein referred to as a "unit". Bits including information about each unit (hereinafter, simply referred to as "unit information") and representing a unique value are added to each unit. Based on the added unit information, the transport packets are aligned with the recording blocks.

Figure 9:
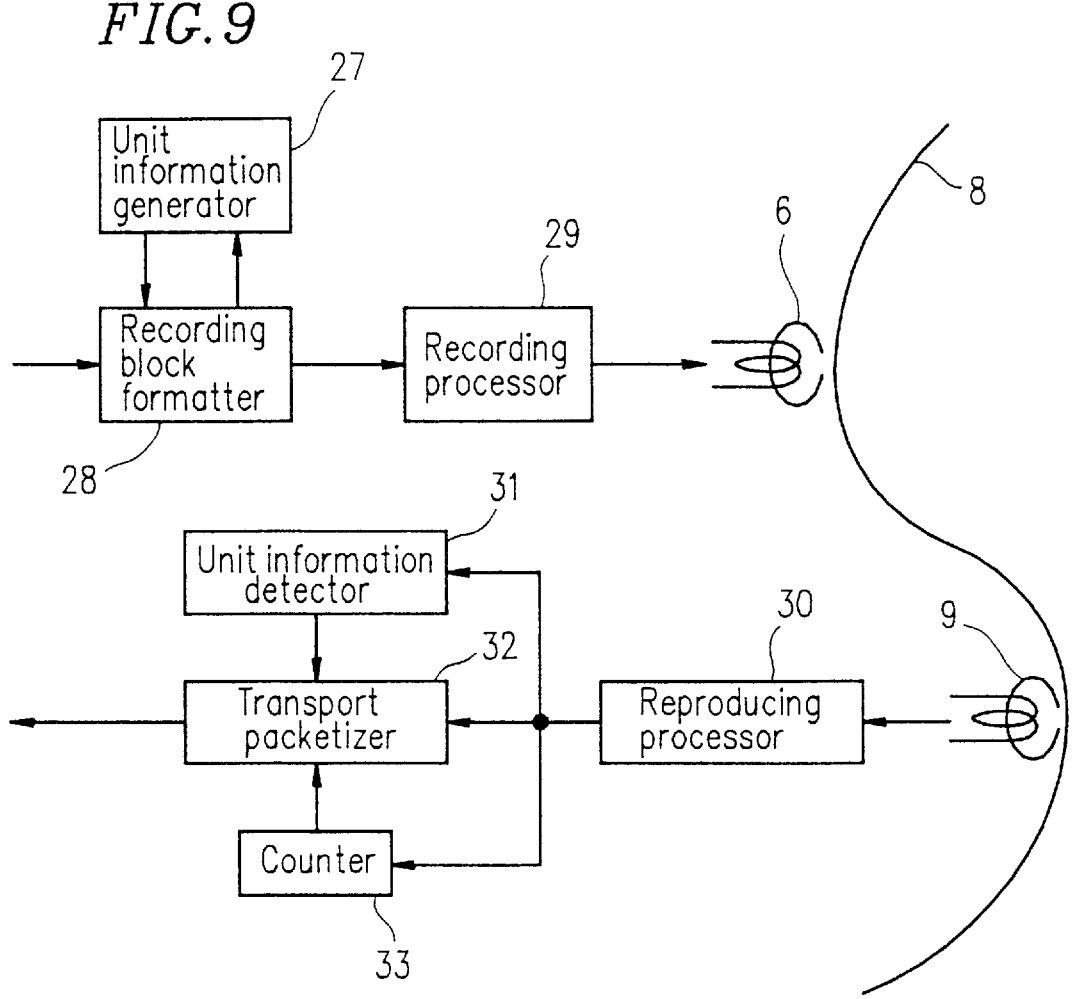
FIG. 9 is a block diagram schematically showing a configuration of an encoded data stream recording and reproducing apparatus according to a fifth example of the present invention.

FIG. 9 is a block diagram schematically showing a configuration of a recording and reproducing apparatus according to a fifth example of the present invention. An input encoded data stream is first input to a recording block formatter 28. A unit information generator 27 retrieves unit information from the input encoded data stream, so as to output the information to the recording block formatter 28. The recording block formatter 28 formats the data stream so that the number M of successive transport packets are recorded as the number N of successive recording blocks, i.e., are recorded in the same unit, as will be described later. A recording processor 29 converts the formatted data stream into a signal suitable for magnetical recording. A recording head 6 records the converted signal on a recording medium 8. A reproducing head 9 outputs a reproduced signal from the recording medium 8. A reproducing processor 30 restores the data stream by performing a reproduction processing for the output reproduced signal. A unit information detector 31, a transport packetizer 32 and a counter 33 generate the number M of successive transport packets from the number N of successive recording blocks as will be described later.

Figure 10:
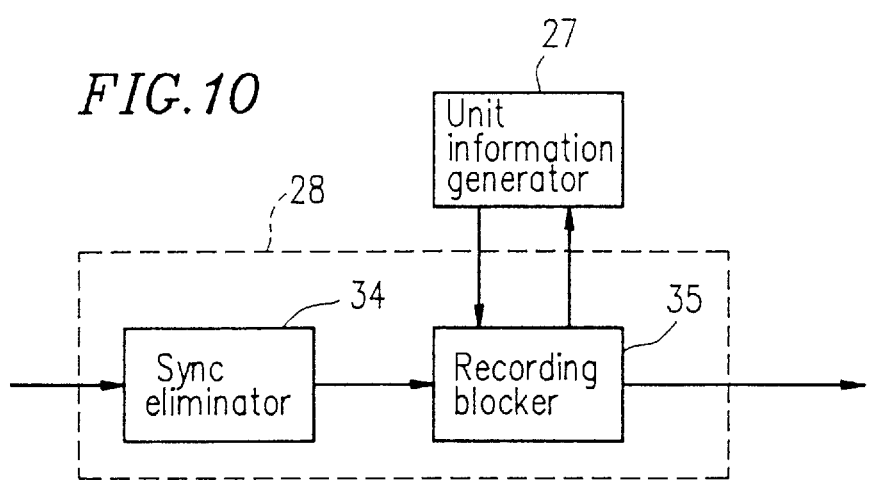
FIG. 10 is a block diagram showing in detail a configuration of a recording block formatter for the recording and reproducing apparatus shown in FIG. 9.

FIG. 10 is a block diagram showing in detail a configuration of the recording block formatter 28. The operation of the recording block formatter 28 will be described with reference to FIG. 10. A sync eliminator 34 eliminates sync bits from the input encoded data stream and then outputs the data stream.

A recording blocker 35 makes a number N of successive recording blocks from a number M of successive transport packets of the input encoded data stream output from the sync eliminator 34. If M is equal to 2 and N is equal to 3, for example, then each unit made from two successive transport packets (i.e., made from three successive recording blocks) starts at the beginning of the two successive transport packets. Two transport packets are hereinafter called to be "aligned with" three recording blocks. In other words, the blocking is performed by the recording blocker 35 so that the two transport packets are stored as one unit in the three successive recording blocks. In order to "align" the M transport packets with the N recording blocks, for example, dummy data is added to the. M transport packets so that the unit made from the M transport packets has the same data length of the N recording blocks.

The unit information generator 27 generates unit information so that the unit information differs at least between adjacent units. The recording blocker 35 inserts the unit information into each recording block.

Figure 11:
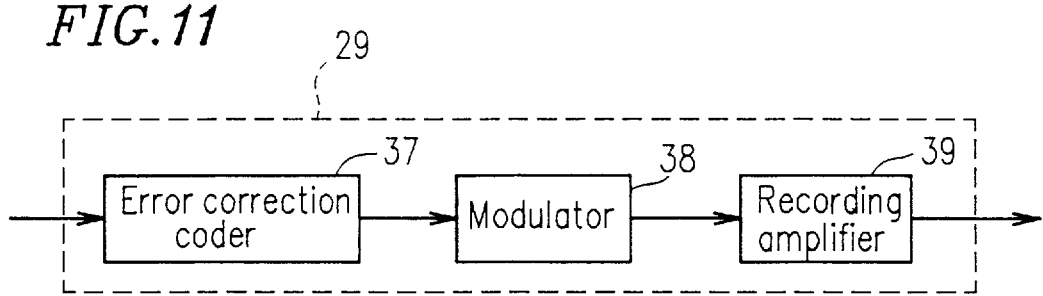
FIG. 11 is a block diagram showing in detail a configuration of a recording processor for the recording and reproducing apparatus shown in FIG. 9.

FIG. 11 is a block diagram showing in detail a configuration of the recording processor 29. The operation of the recording processor 29 will be described with reference to FIG. 11. The output from the recording block formatter 28 is input to an error correction coder 37. The error correction coder 37 performs a Reed-Solomon product coding, for example, and adds a synchronization code and an identification code to each recording block so as to supply the recording block to a modulator 38. The modulator 38 converts the input encoded data stream into a code in a form suitable for being recorded, e.g., a non return to zero (NRZ) code, and then modulates the code. A recording amplifier 39 receives the signal output from the modulator 38, performs equalization of the signal in a manner suitable for being digitally recorded, and then outputs the equalized signal to the recording head 6. The recording head 6 records the signal output from the recording processor 29 on the recording medium 8.

Hereinafter, the reproducing operation of the recording and reproducing apparatus of the fifth example will be described. The reproducing head 9 outputs a signal from the recording medium 8. The recording head 6 may also be used as a reproducing head 9 so as to perform both functions, or separate heads may be used independently. The signal output from the reproducing head 9 is input to the reproducing processor 30.

Figure 12:
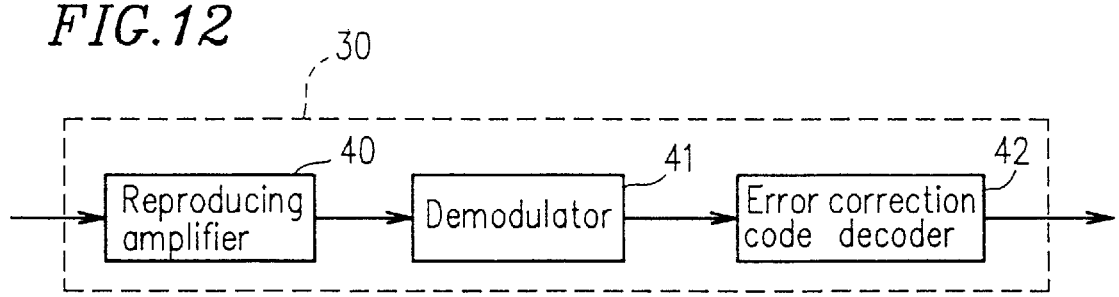
FIG. 12 is a block diagram showing in detail a configuration of a reproducing processor for the recording and reproducing apparatus shown in FIG. 9.

FIG. 12 is a block diagram showing in detail a configuration of the reproducing processor 30. The operation of the reproducing processor 30 will be described with reference to FIG. 12. A reproducing amplifier 40 amplifies the signal output from the reproducing head 9, equalizes the signal so that a bit error rate thereof becomes lowest, and then outputs the signal to a demodulator 41. The demodulator 41 demodulates the signal so that a bit error rate thereof becomes lowest, and then outputs the demodulated signal to an error correction code decoder 42. The error correction code decoder 42 decodes the error correction code, and the decoded data is output to the unit information detector 31, the transport packetizer 32 and the counter 33.

The unit information detector 31 detects the information bits which are different from each other on a unit basis, and outputs an alignment position between the transport packets and the recording blocks. Here, alignment position is the beginning of the unit, where a header of the top transport packet among the M transport packets and a header of the top recording block of the N recording blocks are in the same position. The counter 33 counts the number of the recording blocks and detects the alignment position between the transport packets and the recording blocks. Based on the outputs from the counter 33 and the unit information detector 31, the transport packetizer 32 transforms the recording blocks into the transport packets. In the case where the alignment position output from the counter 33 is different from the alignment position output from the unit information detector 31, the alignment position output from the counter 33 is assumed to be given a priority. However, on the contrary, the alignment position output from the unit information detector 31 may be given a priority.

As described above, according to the present invention, by recording the unit information which is different from each other in adjacent units, the alignment position between the transport packets and the recording blocks can be easily detected by using a circuit of a small size.

As the unit information, a unique code, such as a time stamp for each unit, may be used. The time stamp is not overlapped in the time axis. Therefore, each unit is identified univalently.

EXAMPLE 6

It is noted that a "field" and a "frame" will be called a "frame" for simplification in the following description. Accordingly, a word "inter-frame compression" includes an "inter-field compression".

When an error is detected in the reproduced data by the encoded data stream recording and reproducing apparatus described above, a processing for substituting a previous data stream where no error exists for the data stream where the error has been detected is generally performed. However, in the case where the input encoded data stream represents a video processed by an inter-frame differential coding which follows an MPEG (moving picture experts group) standard, for example, a frame which is several to ten-odd frames before the current frame is substituted for the current frame.

In the case where various trick plays (a high-speed reproduction above all) are performed by a VTR so as to represent a video following the MPEG standard, in particular, no other frame but a frame processed by an intra-frame coding can be used. Accordingly, the correction of the error is not performed by using a frame which is ten-odd frames before the current frame and the visual characteristics of the resulting video displayed on the screen become considerably degraded.

In order to solve the above-mentioned problem, according to the sixth example of the present invention, a recording and reproducing apparatus for correcting the error and for improving the visual characteristics of the video displayed on the screen is provided by performing an intra-frame correction for a video processed by an inter-frame differential coding following the MPEG standard. In particular, the method of this example is very effectively applicable to various trick plays (a high-speed reproduction above all) performed by a VTR so as to represent a video following the MPEG standard.

Figure 13:
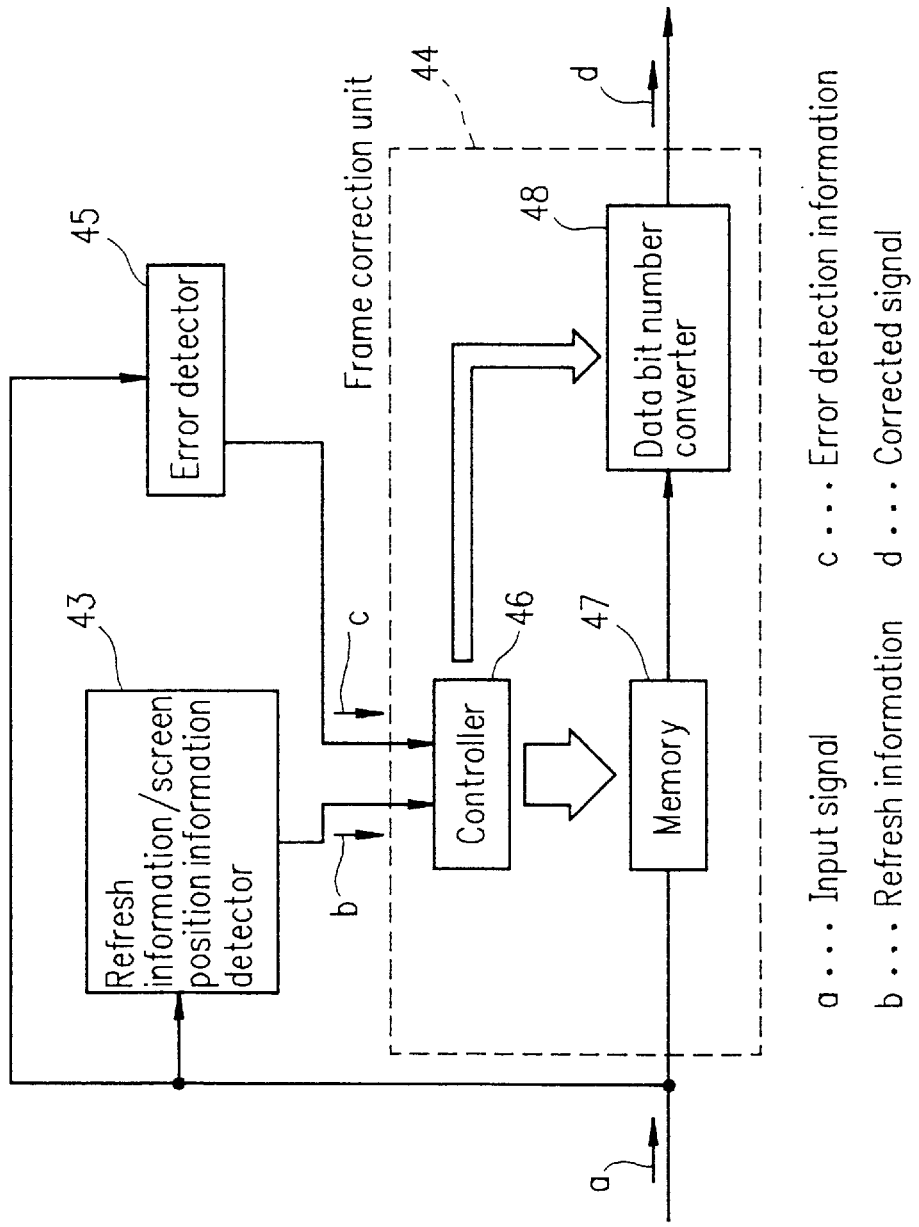
FIG. 13 is a block diagram showing a configuration of a frame correction unit provided for the encoded data stream reproducing section of the recording and reproducing apparatus according to the sixth example of the present invention.

FIG. 13 is a block diagram showing a configuration of a frame correction unit 44 provided for the encoded data stream reproducing section of the recording and reproducing apparatus according to the sixth example of the present invention.

In this example, a bit stream following the MPEG standard will be regraded as the encoded data stream. The bit stream following the MPEG standard is input to a refresh information/screen position information detector 43, an error detector 45 and a memory 47. The refresh information/screen position information detector 43 detects the refresh information and the screen position information of the input data stream. According to the MPEG standard, the refresh is performed on a slice basis. Therefore, it is sufficient to detect a slice header. The screen position information is recorded on the slice header.

In the case where the bit stream following the MPEG standard has been processed by an error correction coding by using a Reed-Solomon codes or the like, the error detector 45 also functions as a decoder for the bit stream. The error detector 45 receives the input bit stream, detects errors and output the error detection information in accordance with the detected errors. Based on the refresh information output from the refresh information/screen position information detector 43 and the error detection information output from the error detector 45, a controller 46 operates in the following manner so as to control the data in the memory 47.

The controller 46 manages a position where the refresh is performed for a frame, i.e., an address at which the slice header is written in the memory 47. If no error is detected by the error detector 45, the data written in the memory 47 is read out and output to a data bit number converter 48 without being subjected to any processing during every refresh period.

If any error is detected by the error detector 45, the controller 46 identifies the refresh period during which the error has been generated, and does not write the input data stream into the memory 47 until the refresh information/screen position information detector 43 detects the next refresh signal, i.e., a slice header. The controller 46 further erases the data stream in the memory 47 by returning backwards to the slice header which was written most recently. In reading the encoded data stream, the data stream in the refresh period during which no error is detected is repeatedly read out several times for substitution, and then output to the data bit number converter 48.

In the refresh period during which no error is detected, the data bit number converter 48 outputs the data stream without performing any processing for the data stream. On the other hand, in the refresh period during which an error is detected, the data in a previous frame in the refresh period during which no error is detected is employed instead for restoring the data stream. In other words, a data stream including no error is substituted for a data stream including an error.

However, data streams in different frames generally have different bit numbers. If the bit number of a data stream including an error is the same as that of a data stream including no error, then it is sufficient to output the data stream including no error without performing any processing for the data. If the bit number of a data stream including no error is smaller than that of a data stream including an error, a stuffing bit (in other words, dummy data) is inserted to equalize the bit number and then the data stream is output. On the contrary, if the bit number of a data stream including no error is larger than that of a data stream including an error, then the video information represented by the data stream is reduced so as to reduce and equalize the bit number.

In order to reduce the video information, a method for preferentially omitting the bits representing high-frequency components in the peripheral portion of the screen can be employed, for example. Since a video following the MPEG standard is processed by a discrete cosine transform (DCT), the visual characteristics of the video are not degraded so much even if the bits representing high-frequency components in the peripheral portion of the screen are omitted.

EXAMPLE 7

Figure 14:
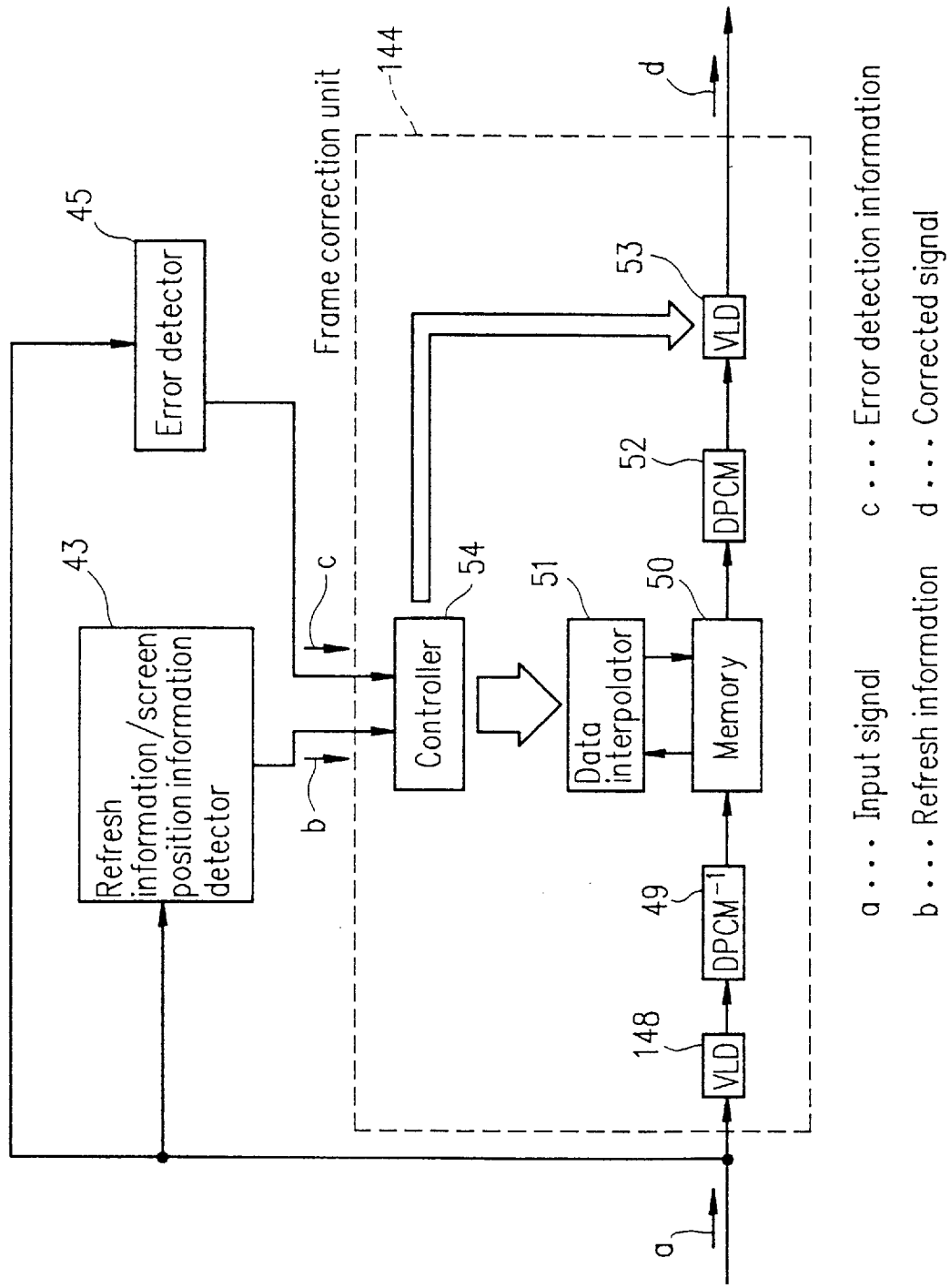
FIG. 14 is a block diagram showing a configuration of a frame correction unit provided for an encoded data stream reproducing section in a recording and reproducing apparatus according to a seventh example of the present invention.

FIG. 14 is a block diagram showing a configuration of a frame correction unit 144 provided for an encoded data stream reproducing section in a recording and reproducing apparatus according to a seventh example of the present invention.

The recording and reproducing apparatus for correcting a data stream for a frame of this seventh example is different from the apparatus of the sixth example. In the sixth example, the refresh period during which no error is detected is substituted for the refresh period during which an error is detected. On the other hand, according to the apparatus of the seventh example, the data in the refresh period during which an error is detected is interpolated by the data in the refresh period during which no error is detected. That is to say, the former data is interpolated by the latter data surrounding the former data on an actual screen. A bit stream following the MPEG standard is regarded as an input signal.

The operations of the refresh information/screen position information detector 43 and the error detector 45 are the same as those described in the sixth example. A variable length decoder 148 (hereinafter, simply referred to as a "VLD") decodes a variable length code, i.e., an input data stream, and then outputs the code to a differential PCM decoder 49 (hereinafter, simply referred to as a "DPCM$^{-1}$"). The DC components of the video are processed by a differential pulse coding. The DPCM$^{-1}$ 49 decodes the data stream processed by the differential pulse coding so as to output the data stream to a memory 50. The memory 50 sequentially stores the input data stream.

A data interpolator 51 interpolates the data in the refresh period during which an error is detected by using a data surrounding the data on the screen. A controller 54 performs the data control accompanying the interpolation in the following manner.

The controller 54 receives the signals output from the refresh information/screen position information detector 43 and the error detector 45. The controller 54 interpolates the data in the refresh period during which an error is detected by using a data surrounding the data on the screen. Then the controller 54 outputs an instruction to the data interpolator 51 so that the data obtained by the interpolation is overwritten at a position of the memory 50 where the data in the refresh period during which an error is detected is stored. In the case where no error is detected or after the interpolation is finished, the memory 50 outputs the data for every refresh period.

The data output from the memory 50 is output to a differential PCM (hereinafter, simply referred to as a "DPCM") coder 52. The DCPM coder 52 processes the DC components of the data by a differential pulse coding, and then outputs the data to a variable length coder 53 (hereinafter, simply referred to as a "VLC"). The VLC 53 processes the input data by a variable length coding. In this case, the VLC 53 has obtained a bit number of the data before the interpolation corresponding to the interpolated data in the refresh period from the controller 54. Based on this information, the VLC 53 processes the data by the variable length coding so that the bit number of the interpolated data is equal to the bit number of the data before the interpolation. As described above, if the bit number of the interpolated data is smaller than that of the data before the interpolation, a stuffing bit is inserted. On the contrary, if the bit number of the interpolated data is larger than that of the data before the interpolation, the components of the data representing high-frequency components in the peripheral portion of the screen are preferentially omitted. Since a video following the MPEG standard is processed a DCT, the visual characteristics of the video are not degraded so much even if the information representing high-frequency components in the peripheral portion of the screen are omitted.

EXAMPLE 8

A so-called high-speed reproduction function, that is to say, a function for viewing a video by transporting a tape on which an encoded data stream is recorded at a faster speed than the speed in a normal reproduction, is indispensable for a recording and reproducing apparatus. According to a suggested method, by repeatedly recording the data for the high-speed reproduction on high-speed reproduction regions on the tape several times, it is possible to perform the high-speed reproduction stably while simplifying the control of the cylinder and the tape during the high-speed reproduction.

Figure 15:
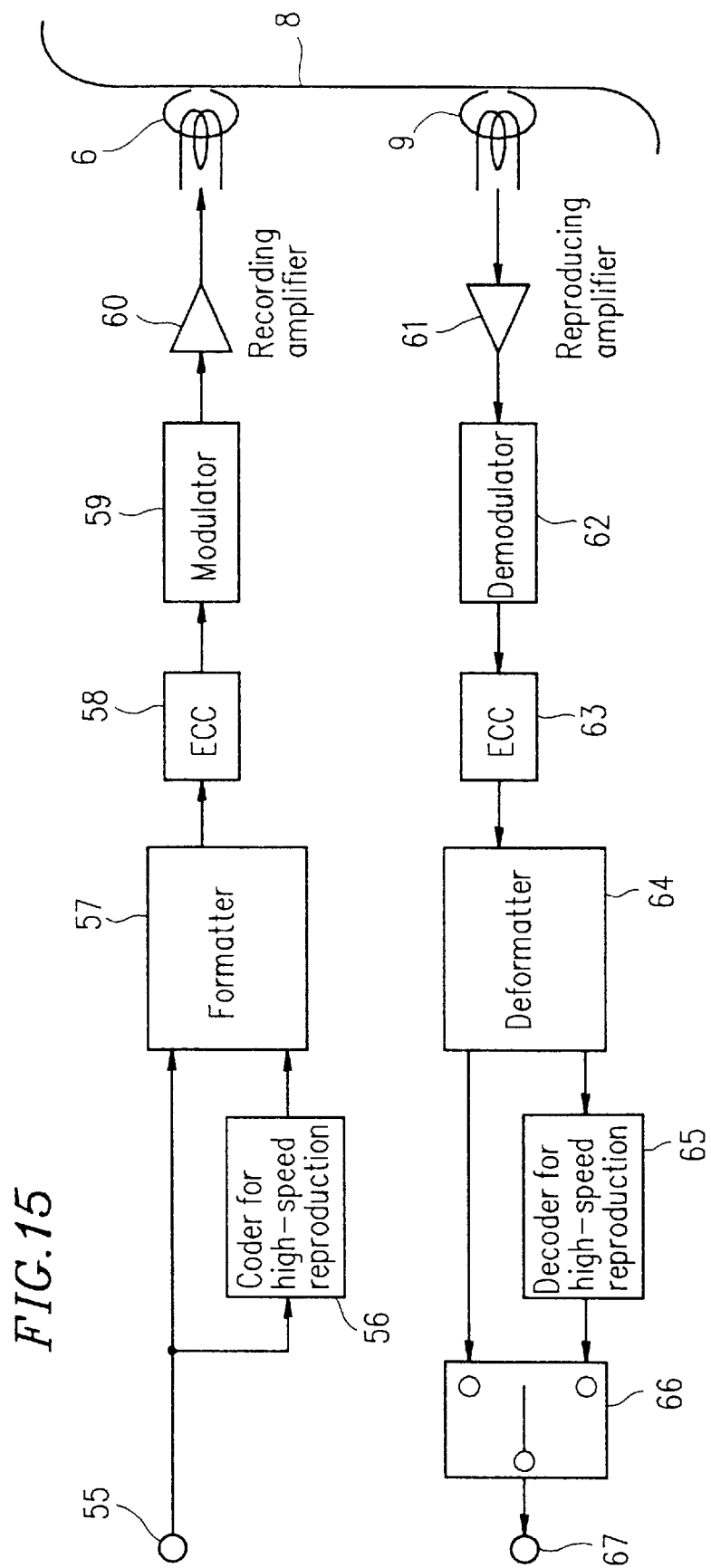
FIG. 15 is a block diagram schematically showing a configuration of a conventional recording and reproducing apparatus.

FIG. 15 is a block diagram showing a configuration of a conventional recording and reproducing apparatus. First, the conventional recording and reproducing apparatus will be described with reference to FIG. 15.

A digital video signal input from an input terminal 55 is input to a formatter 57 so as to generate a data for a normal reproduction, and to a coder 56 for a high-speed reproduction so as to generate a data for a high-speed reproduction. The coder 56 for a high-speed reproduction generates the data for a high-speed reproduction from the input digital video signal so as to output the data to the formatter 57.

In the case where the data for the high-speed reproduction is a data processed by an inter-frame compression, all the data for the high-speed reproduction is composed of either an intra-frame compressed data or important components of the data for representing a video. By using such a data for a high-speed reproduction, it is possible to reproduce a video on the screen at an even smaller bit number.

The formatter 57 changes the order of the two input data for a normal reproduction and for a high-speed reproduction so as to format the two data in a track pattern shown in FIG. 16, and then output the data to an error correction coder 58 (hereinafter, simply referred to as an "ECC"). The ECC 58 adds an error correction code to the input data and then output the data to a modulator 59. The modulator 59 modulates the error correction coded data stream so as to output the data stream to a recording amplifier 60. The recording amplifier 60 amplifies the modulated signal so as to output the signal to a recording head 6. The recording head 6 records the amplified signal on a tape-shaped recording medium 8.

Next, the reproducing operation of the conventional recording and reproducing apparatus will be described. A reproducing amplifier 61 receives and amplifies the signal reproduced by a reproducing head 9 (the recording head 6 can also be used for the reproduction of the signal). A demodulator 62 demodulates the amplified signal so as to output the signal to an ECC 63. The ECC 63 corrects the error generated during the recording and the reproduction as much as possible, so as to output the corrected data to a deformatter 64. The deformatter 64 receives the error-corrected data and then changes the order of the data so as to restore the order of the data before being recorded. The deformatter 64 divides the obtained data into a data for a normal reproduction and a data for a high-speed reproduction, thereby outputting the two data to one terminal of a switch 66 and a decoder 65 for a high-speed reproduction, respectively. The decoder 65 for a high-speed reproduction converts the format of the data for a high-speed reproduction into a format similar to that of the data for a normal reproduction by decoding the data for a high-speed reproduction, so as to output the converted data to the other terminal of the switch 66.

When a normal reproduction operation is performed, the switch 66 selects the data for a normal reproduction, so as to output the data as an output video signal from an output terminal 67. On the other hand, when a high-speed reproduction operation is performed, the switch 66 selects the data for a high-speed reproduction output from the decoder 65 for a high-speed reproduction, so as to output the data as an output video signal from the output terminal 67.

As described above, FIG. 16 shows an exemplary track pattern formed by the formatter 57. As shown in FIG. 16, each track consists of a high-speed reproduction data region 68 or 69 and a normal reproduction data region 70. The data is recorded in the high-speed reproduction data regions 68 and 69 by using respectively different azimuths A and B. In this example, the data for a high-speed reproduction is recorded by alternately using the two different azimuths A and B. By using the track pattern shown in FIG. 16, it is possible to surely reproduce the data for a high-speed reproduction irrespective of the configurations of the heads and the cylinder.

Figure 16:
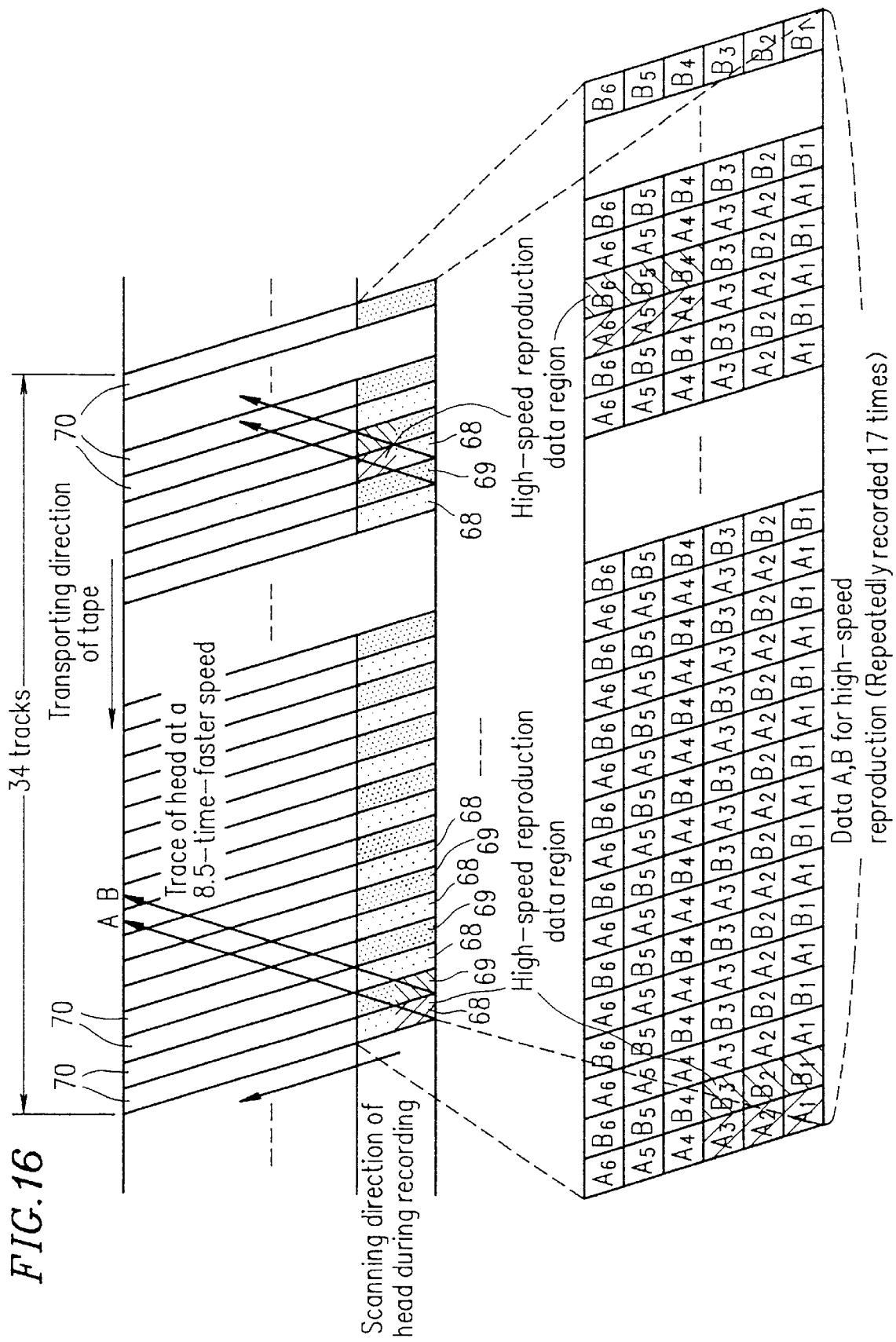
FIG. 16 shows a track pattern formed by a formatter in a conventional recording and reproducing apparatus.
Figure 17A:
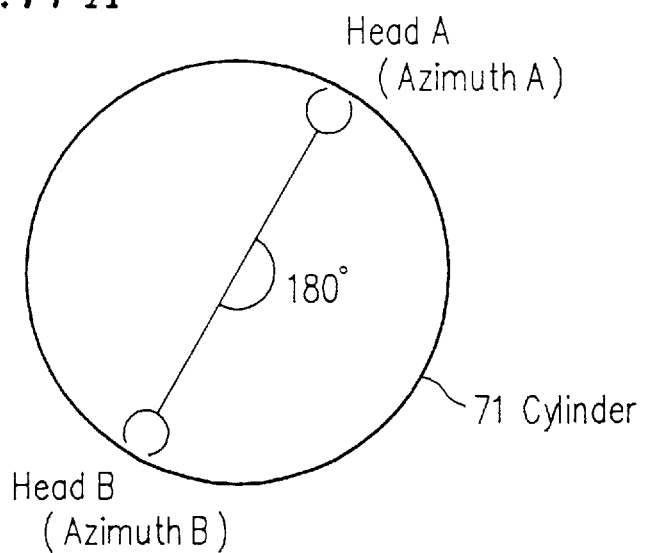
FIGS. 17A and 17B show a cylinder on which two heads having different azimuths are disposed for realizing a high-speed reproduction.
Figure 17B:
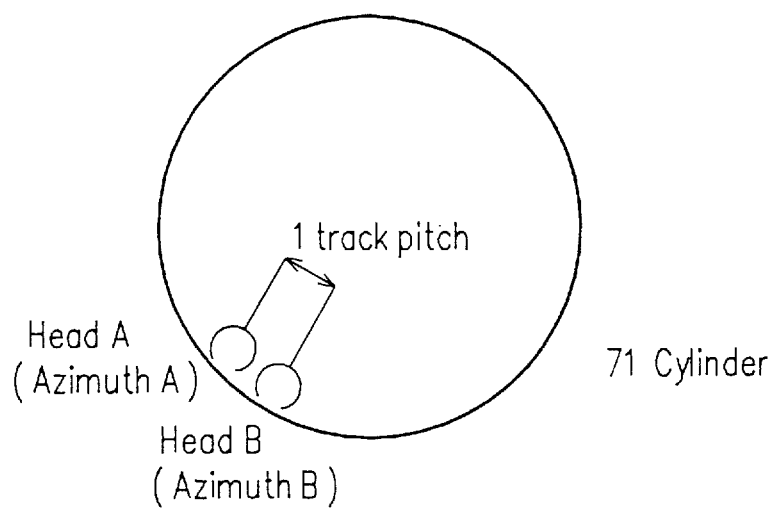

As shown in FIG. 16, the respective data for a high-speed reproduction are repeatedly recorded in the high-speed reproduction data regions 68 and 69 on the thirty-four tracks by alternately using the pair of different azimuths A and B seventeen times. FIG. 17A shows a cylinder 71 where two heads having different azimuths A and B are disposed so as to be opposed to each other along the diameter of the cylinder 71 (or spaced apart from each other by 180 degrees). FIG. 17B shows a cylinder 71 where two heads having different azimuths A and B are spaced apart from each other by one track pitch in a direction parallel to the rotation axis of the cylinder 71 and are located at the same position in a direction along the circumference of the cylinder 71. By using the heads shown in FIGS. 17A and 17B, when the data is reproduced at a speed equal to or slower than an 8.5-time-faster speed (the speed is set to be n (an integer) +0.5 time faster, i.e., 8.5, 7.5, 6.5, 5.5, and so on), the data recorded in the two kinds of regions by using the azimuths A and B can be complementarily reproduced during two rotations of the cylinder 71.

FIG. 16 shows the data scanned by the heads shown in FIG. 17B at an 8.5-time-faster speed. During the first scanning of the heads, the data in the portions indicated by $A_1, A_2, A_3, B_1, B_2$, and $B_3$ are reproduced, and during the second scanning, the data in the portions indicated by $A_4, A_5, A_6, B_4, B_5$, and $B_6$ are reproduced. By performing the scanning twice, all the data can be reproduced.

As described above, when the reproduction is performed at an (n+0.5)-time-faster speed, by alternately and repeatedly recording the two kinds of data A and B to be searched in the search regions over the number (n+0.5)×4 of tracks, all these data can be surely reproduced. Since these data do not change if the trace of the heads are different, it is possible to control the heads and the magnetic tape easily during the high-speed reproduction. However, in the case where a recording and reproducing apparatus having a conventional configuration, the data for a high-speed reproduction is recorded by selecting the fastest speed among the speeds usable for the high-speed reproduction. Accordingly, in the case where the high-speed reproduction is performed at a relatively slower speed, the amount of the data of the video reproduced during a unit time period becomes small, and therefore the period required for updating the reproduction screen becomes disadvantageously longer.

Figure 18:
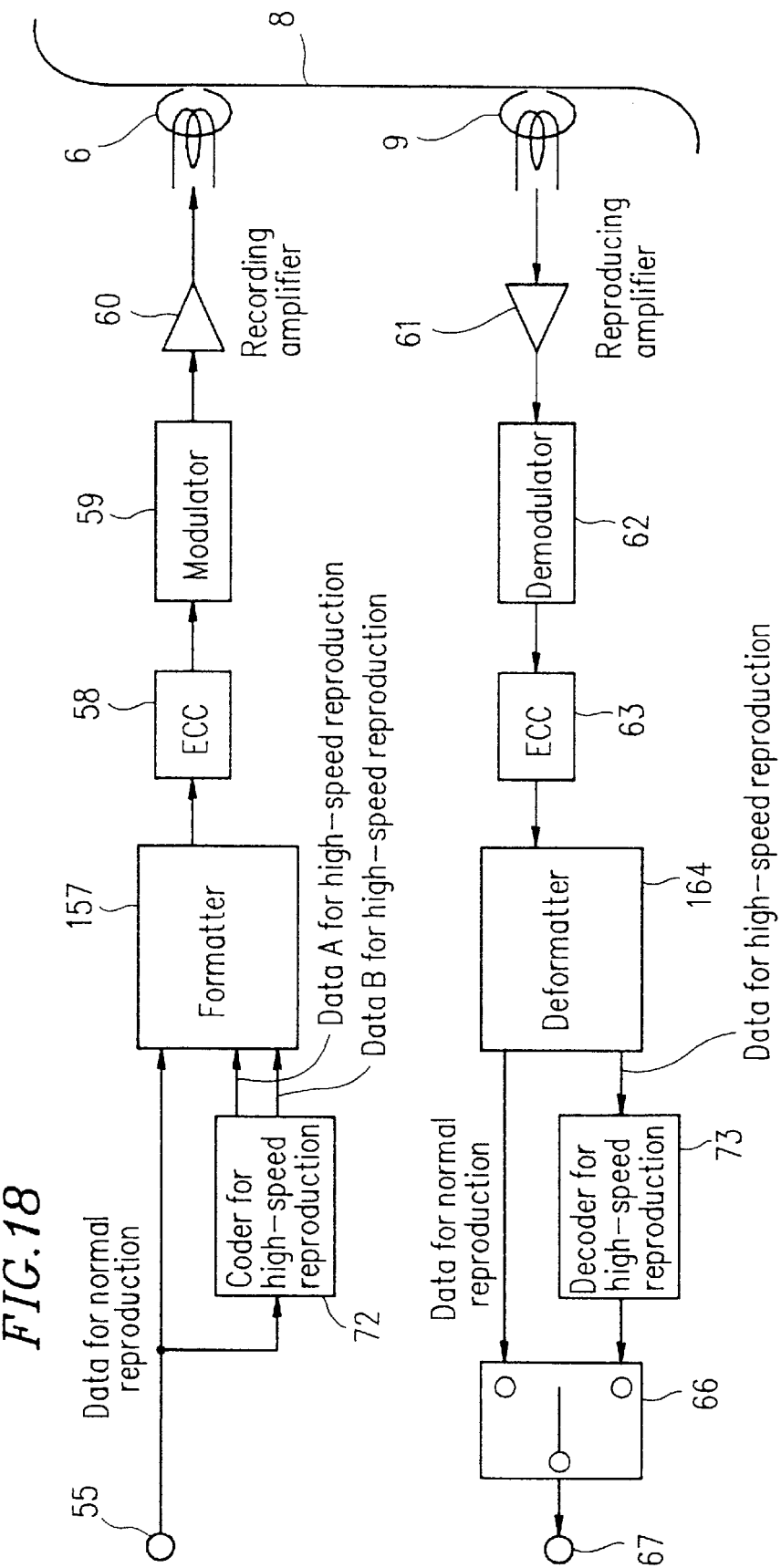
FIG. 18 is a block diagram schematically showing a configuration of a recording and reproducing apparatus according to an eighth example of the present invention.

In order to solve such a conventional problem, a recording and reproducing apparatus according to an eighth example of the present invention has been developed. FIG. 18 is a block diagram showing a configuration of a recording and reproducing apparatus according to the eighth example of the present invention.

In this example, a digital video signal input to an input terminal 55 is input to a formatter 157 as a data for a normal reproduction, and to a coder 72 for a high-speed reproduction, too. The coder 72 for a high-speed reproduction generates a data A for a high-speed reproduction at the fastest speed (hereinafter, simply referred to as a "data A") and a data B for a high-speed reproduction at a speed slower than the speed used for the reproduction of the data A (hereinafter, simply referred to as a "data B") so as to output the two data to the formatter 157. In the case where the data for the high-speed reproduction is a video signal processed by an inter-frame compression, all the data for the high-speed reproduction is composed of either an intra-frame compressed data or only important components of the video signal. By using such a data for a high-speed reproduction, it is possible to reproduce a video on the screen by using an even smaller amount of data.

The data A is the data for the high-speed reproduction performed at the fastest speed. Accordingly, the data A is coded by using all or a part of the frames of the video data for a normal reproduction depending upon the amount of the data which can be recorded on a tape. The data B is the data for the high-speed reproduction performed at a speed slower than the speed used for the reproduction of the data A. Since the data B has a reproduction period shorter than that of the data A, the data B is coded as a data for the high-speed reproduction by using a larger number of frames or a larger amount of video data as compared with the case of generating the data A.

As will be described later, the formatter 157 changes the order of these data A and B for the high-speed reproduction and then formats the data A and B so that each data is repeatedly recorded at predetermined times.

In the recording and reproducing apparatus according to the eighth example of the present invention, the data is also processed in the same way as in the conventional example described above since the data is input to the ECC 58 until the data is output from the ECC 63 to the deformatter 164.

The deformatter 164 receives the output from the ECC 63, so as to restore the order of the data and divide the data into the data for a normal reproduction and the data A and B for a high-speed reproduction. The switch 66 selects the data for a normal reproduction so as to output the data as an output video signal during a normal reproduction. On the other hand, during the high-speed reproduction, a decoder 73 for a high-speed reproduction decodes the reproduced data A and B for the high-speed reproduction by a method described later so as to restore the format of the data into a format similar to that of the data for a normal reproduction and output the formatted data for the high-speed reproduction as an encoded data stream from the output terminal 67 via the switch 66.

Figure 19:
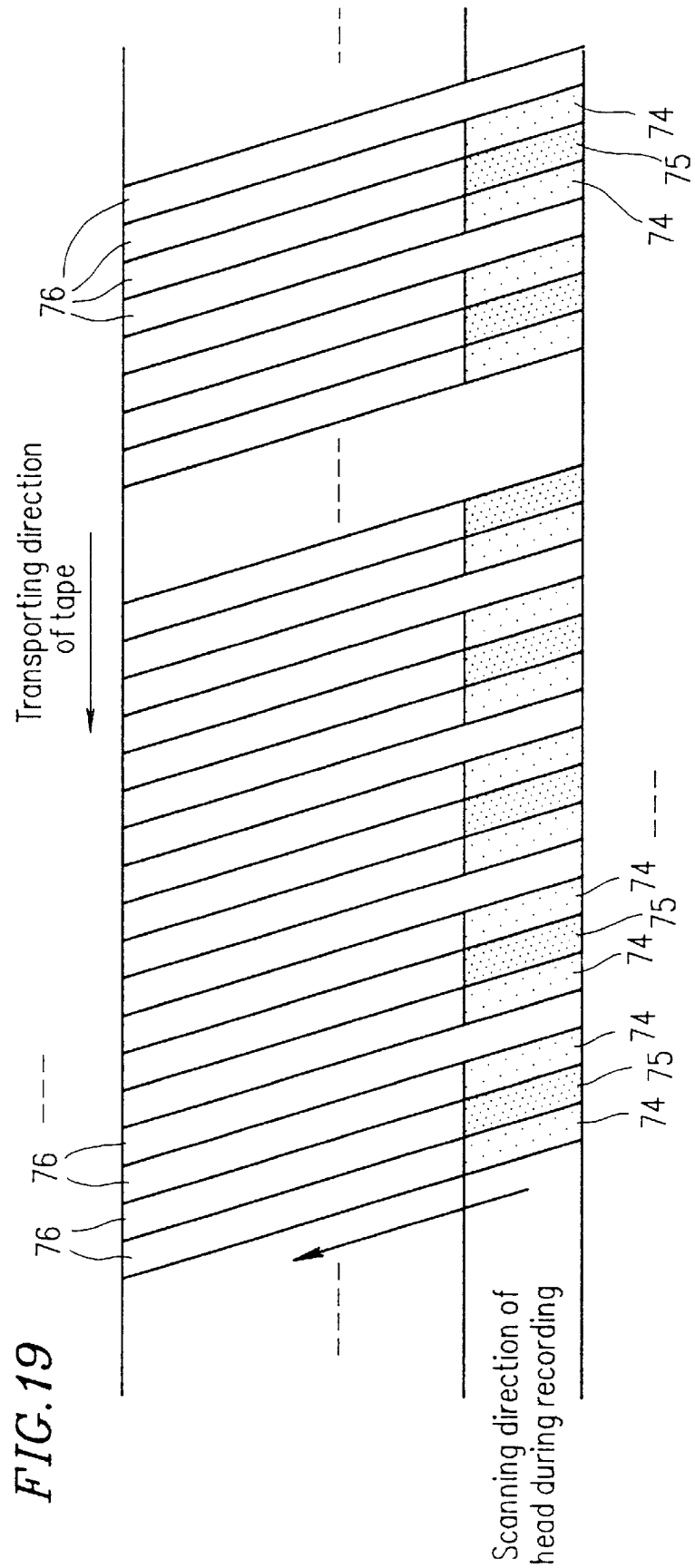
FIG. 19 shows another track pattern formed by a formatter in a recording and reproducing apparatus according to the eighth example of the present invention.

FIG. 19 shows another exemplary track pattern formed by the formatter 157. As shown in FIG. 19, each track consists of a high-speed reproduction data region 74 or 75 and a normal reproduction data region 76. The video data for a normal reproduction is recorded on the normal reproduction data region 76. The data A and B for the high-speed reproduction are recorded on the high-speed reproduction data regions 74 and 75, respectively.

Figure 20:
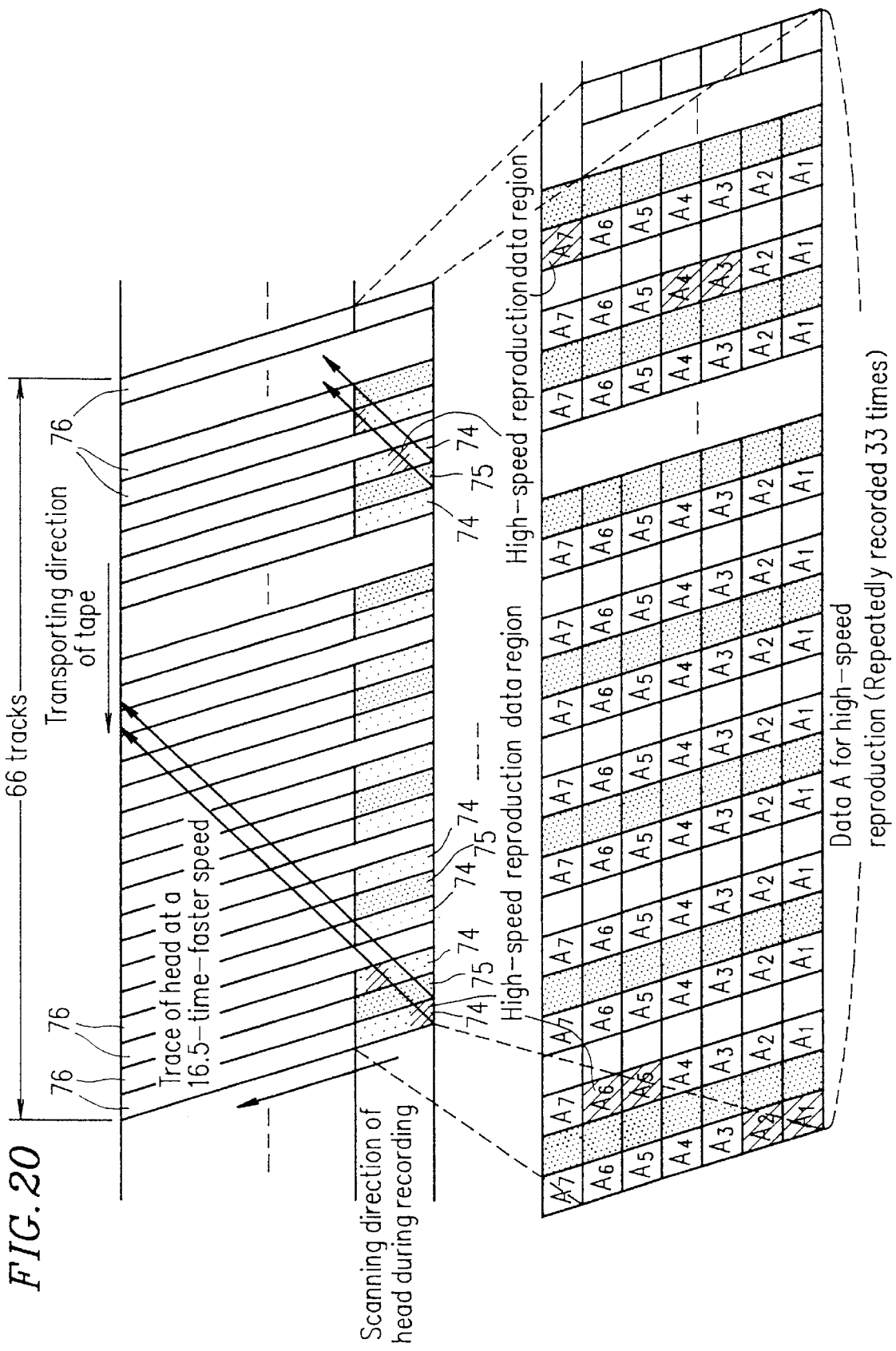
FIG. 20 shows still another track pattern formed by a formatter in a recording and reproducing apparatus according to the eighth example of the present invention.

As shown in FIG. 20, when the fastest speed is 16.5-time-faster for example, the same data for the high-speed reproduction is repeatedly recorded in the thirty-three high-speed reproduction data regions 74 among the sixty-six tracks by using the azimuth A, in the same way as the conventional track pattern shown in FIG. 16. By using such a track pattern, when the data is reproduced at a speed equal to or slower than the 16.5-time-faster speed, i.e., an (n+0.5)-time-faster speed, all the data A recorded in the high-speed reproduction data regions 74 is scanned and interpolated twice by the head having an azimuth A so as to be complementarily reproduced during two rotations of the cylinder 71 shown in FIGS. 17A and 17B. As a result, the high-speed reproduction can be performed.

In the case where the head scans the data while following the trace as shown in FIG. 20, it is possible to reproduce the data in the portions indicated by $A_1$, $A_2$, $A_5$ and $A_6$ during the first scanning and reproduce the data in the portions indicated by $A_3$, $A_4$ and $A_7$ during the second scanning. In addition, by varying the integer n for the (n+0.5)-time-faster speed, all the data for the high-speed reproduction can be surely reproduced in the same way as shown in FIG. 20 even if the head trace is different. By recording the data using such a track pattern, the high-speed reproduction can be performed only by controlling the tape transporting speed.

Figure 21:
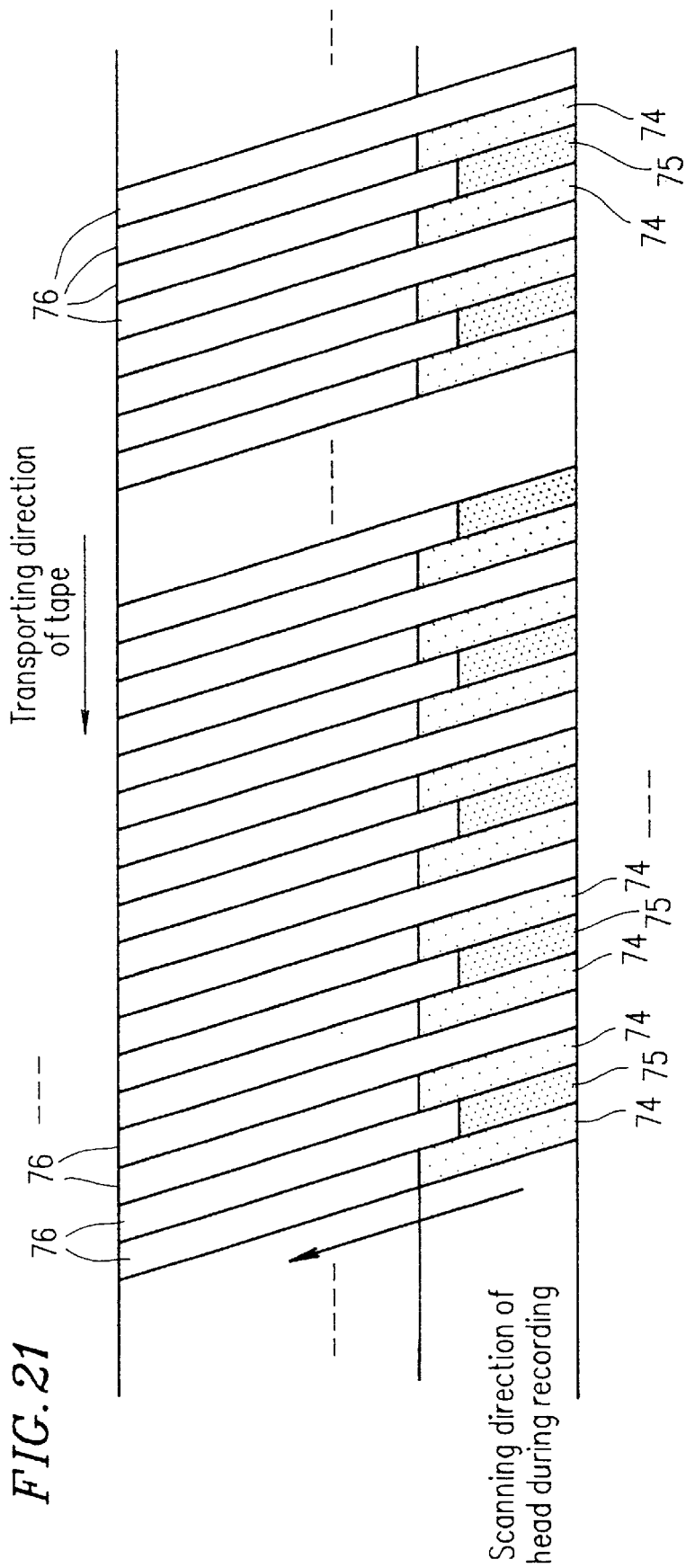
FIG. 21 shows still another track pattern formed by a formatter in a recording and reproducing apparatus according to the eighth example of the present invention.

FIG. 21 shows a still another exemplary track pattern. A recording and reproducing apparatus having a similar configuration to that of the recording and reproducing apparatus shown in FIG. 18 is also used for this track pattern. However, the tape format determined by the formatter 157 is different from the format described above. The data A and B for the high-speed reproduction are recorded in the high-speed reproduction data regions 74 and 75, respectively, and the data for the normal reproduction is recorded in the normal reproduction data regions 76. As shown in FIG. 21, the high-speed reproduction data regions 74 are required to be formed on the every other track having the same azimuth along the longitudinal direction of the tape. In this case, the data A for the high-speed reproduction is reproduced in totally the same way as in the track pattern described above. The high-speed reproduction data regions 74 and 75 can be provided in any portions on the track.

Figure 22:
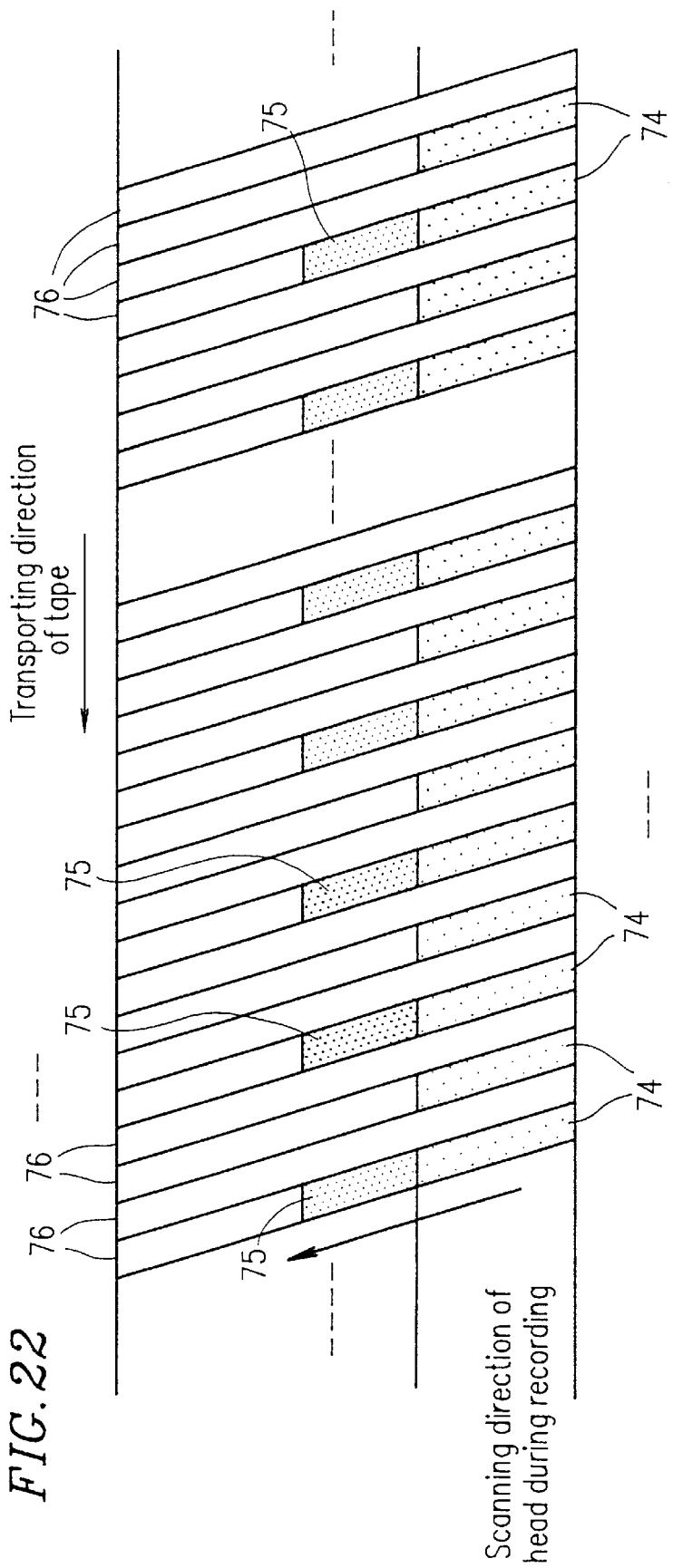
FIG. 22 shows still another track pattern formed by a formatter in a recording and reproducing apparatus according to the eighth example of the present invention.

FIG. 22 shows a still another exemplary track pattern. In FIG. 22, the high-speed reproduction data regions 74 and 75 are provided within the same track. Accordingly, the data A and B for the high-speed reproduction are required to be recorded by using the same azimuth.

The high-speed reproduction data regions 75 on which the data B for the high-speed reproduction are recorded are separately provided from the high-speed reproduction data regions 74. Since the data B for the high-speed reproduction is reproduced in the same way as the data A for the high-speed reproduction, the data B for the high-speed reproduction can be recorded in the regions with a different length from that of the high-speed reproduction data regions 74 as shown in FIGS. 21 and 22. In addition, the high-speed reproduction data region 75 can be provided at any portion on the track.

In FIGS. 21 and 22, each high-speed reproduction data region 74 is provided on the end portion on every other track. However, both the high-speed reproduction data regions 74 and 75 can be provided at arbitrary portions on the track. For example, these regions may be provided in the center portions of the track instead of the end portions thereof.

Moreover, the high-speed reproduction data regions 74 can be formed so that two kinds of data are repeatedly and alternately recorded and reproduced on/from the regions on all the tracks, e.g., $A_a$, $A_b$, $A_a$, $A_b$, etc, for data A. Here, subscripts "$_a$" and "$_b$" denote the different kinds of the azimuth. Also, the lengths and the positions of the portions $A_a$ and $A_b$ may be different from each other.

Furthermore, the high-speed reproduction data regions 74 and 75 can be provided in a plurality of divided portions on one track. In such a case, it is also possible to reproduce the respective data for the high-speed reproduction.

Figure 23A:
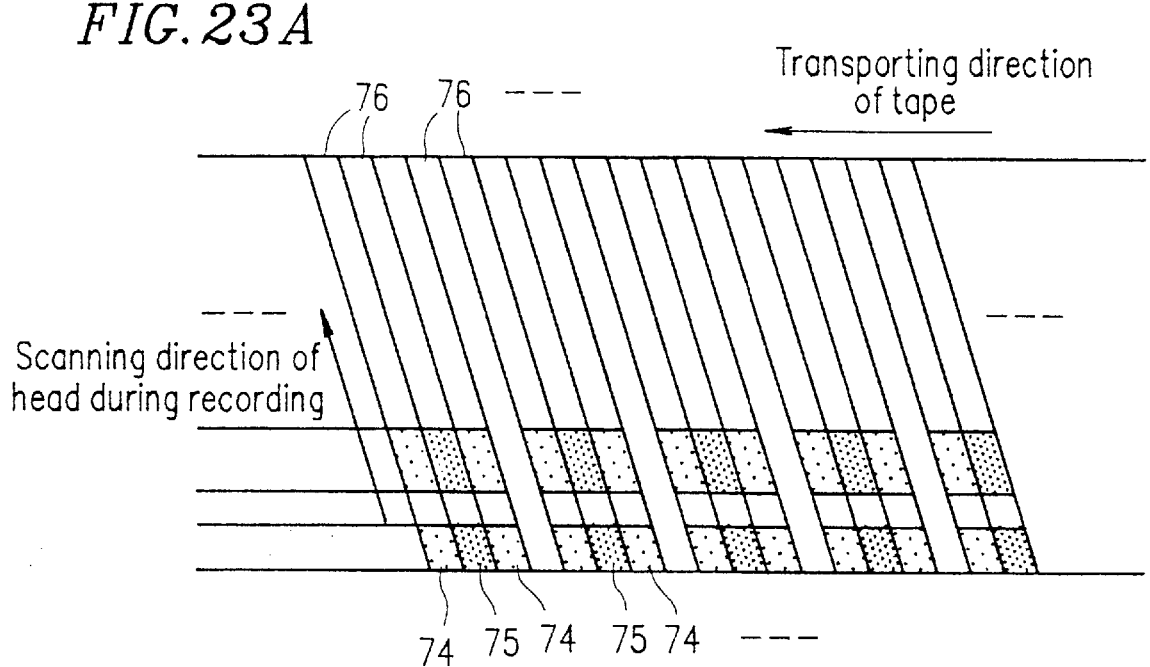
FIGS. 23A and 23B show still another track patterns formed by a formatter in a recording and reproducing apparatus according to the eighth example of the present invention.
Figure 23B:
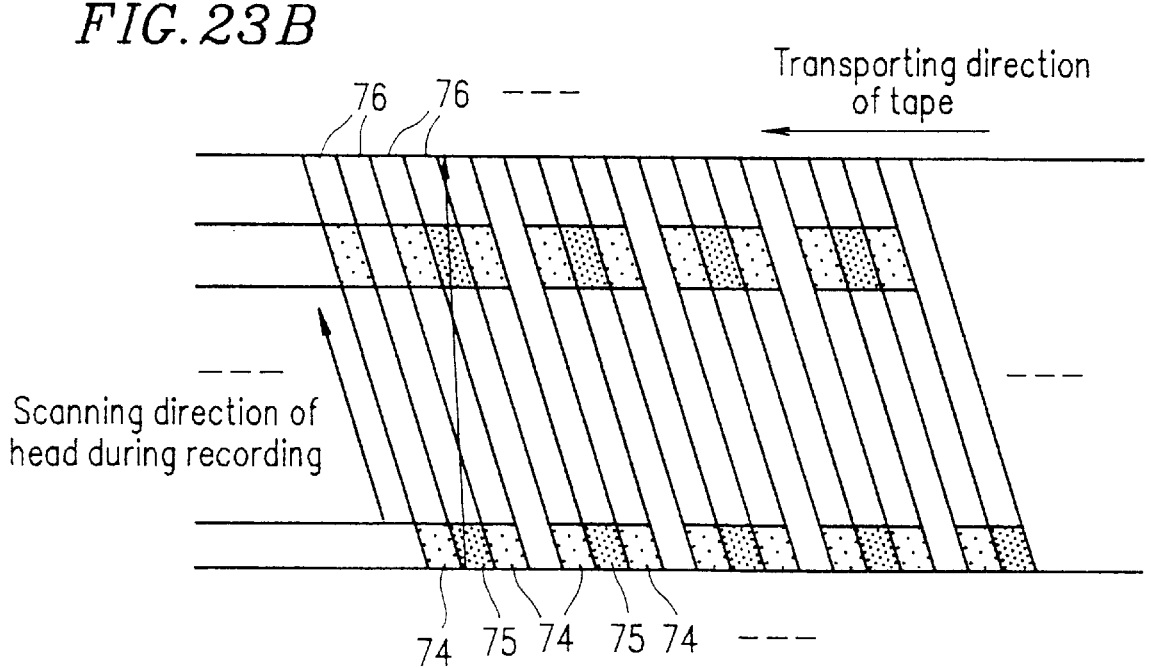

FIGS. 23A and 23B show s till another exemplary track pat terns. A recording and reproducing apparatus having a similar configuration to that of the recording and reproducing apparatus shown in FIG. 18 is also used for these track patterns. The data A and B for the high-speed reproduction are recorded in the high-speed reproduction data regions 74 and 75, respectively, and the data for the normal reproduction is recorded in the normal reproduction data regions 76.

As shown in FIGS. 23A and 23B, each pair of high-speed reproduction data regions 74 and 75 are provided in two separated portions on one and the same track. In this case, the high-speed reproduction data regions 74 are required to be formed on the every other track having the same azimuth along the longitudinal direction of the tape, in the same way as in the track pattern described above. Therefore, the data A for the high-speed reproduction recorded on the high-speed reproduction data regions 74 can be surely reproduced, in both cases shown in FIGS. 23A and 23B.

In the exemplary track patterns shown in FIGS. 23A and 23B, each pair of the high-speed reproduction data regions 75 on which the data B for the high-speed reproduction is recorded are also provided in two separated portions on one and the same track. FIG. 23A shows the case where the data B recorded in the high-speed reproduction data regions 75 separately provided in two portions on the same track is reproduced by a reproducing head during each scanning for a high-speed reproduction. On the other hand, FIG. 23B shows the case where the data B recorded in the two high-speed reproduction data regions 75 on the two different tracks is reproduced by a reproducing head during each scanning for a high-speed reproduction. In the example, the high-speed reproduction data regions 75 are separately provided in two reproducible portions on each track. However, the high-speed reproduction data regions 75 may be separately provided in three or more reproducible portions on the same track or in three or more reproducible portions on a plurality of the tracks.

In the foregoing description, the data for a normal reproduction is distinguished from the data for a high-speed reproduction. However, a data obtained by compressing the data for a normal reproduction can be used as the data for a high-speed reproduction. Alternatively, the data for a normal reproduction may be used without processing the data by a compression, or a totally different data can be substituted for the data for a high-speed reproduction.

In this example, the fastest speed for a high-speed reproduction is set to be a 16.5-time-faster speed for the high-speed reproduction data regions 74 and a 4-time-faster speed for the high-speed reproduction data regions 75. Alternatively, other speeds can also be used.

In place of setting the highest reproduction speed to be a 16.5-time-faster for reproducing the data A from the high-speed reproduction data regions 74, the data A can also be reproduced by using a similar pattern when the speed is set to be a minus 16.5-time-faster speed or a minus (n+0.5)-time-faster speed.

Moreover, in all the exemplary track patterns described above, a plurality of high-speed reproduction data regions 75 alone may be provided on the head trace so that the high-speed reproduction data regions 75 located in different positions on the same track are scanned by a single scan of the head.

Furthermore, in all the exemplary track patterns described above, the high-speed reproduction data regions 75 may be provided on every N (N: integer) tracks or on a plurality of positions during one scanning of the head. For example, when N=6, the high-speed reproduction data regions 75 may be provided on every 6 tracks, and when N=8, the high-speed reproduction data regions 75 may be provided on every 8 tracks.

In addition, the pair of heads shown in FIG. 17B can be provided for each position where each of the two heads shown in FIG. 17A is provided so as to be opposed to each other by 180 degrees. Accordingly, a cylinder provided with four heads can be used and the rotation speed of the cylinder can be halved. In such a case, the same effects can be attained by appropriately setting the length of the high-speed reproduction data regions 75.

Furthermore, the present invention has been described as being applied to a recording and reproducing apparatus in all the foregoing examples. Alternatively, the present invention is applicable to a recording apparatus including the recording section described in any of the examples, or a reproducing apparatus including the reproducing section described in any of the examples.

As described above, in a recording and reproducing apparatus according to the present invention, two separate high-speed reproduction data regions are provided for a pair of tracks having different azimuths, and a data to be reproduced at a higher speed is recorded on one of the two regions while a data to be reproduced at a relatively slower speed is recorded on the other of the two regions. In addition, even when the data is reproduced at a low speed, it is possible to provide a recording and reproducing apparatus allowing for reproducing a video of high-quality with a short updating period by maintaining a predetermined relationship between a scanning position of a head and the phase of the tape by controlling the speed of the head or the tape-shaped recording medium.

EXAMPLE 9

It is noted that a "field" and a "frame" will be called a "frame" for simplification in the following description. Accordingly, a word "inter-frame compression" includes an "inter-field compression".

Conventionally, in a recording and reproducing apparatus for recording an encoded data stream, e.g., a digital signal compressed by utilizing a correlation between the frames (namely, an inter-frame or an inter-field compressed signal), at least two kinds of bit streams including a bit stream for a normal reproduction and a bit stream for a high-speed reproduction are recorded and the bit streams are reproduced by selecting an appropriate one in accordance with the reproduction speed, thereby realizing a variable speed reproduction.

In order to realize both a fast forward reproduction and a reverse reproduction, only an intra-frame compressed signal has been used as the bit stream for a high-speed reproduction. Conventionally, in the case of recording an inter-frame compressed signal, a fast forward reproduction can be performed but the reverse reproduction cannot be performed. Therefore, an intra-frame compressed signal is recorded as a data for a high-speed reproduction.

Figure 24A:
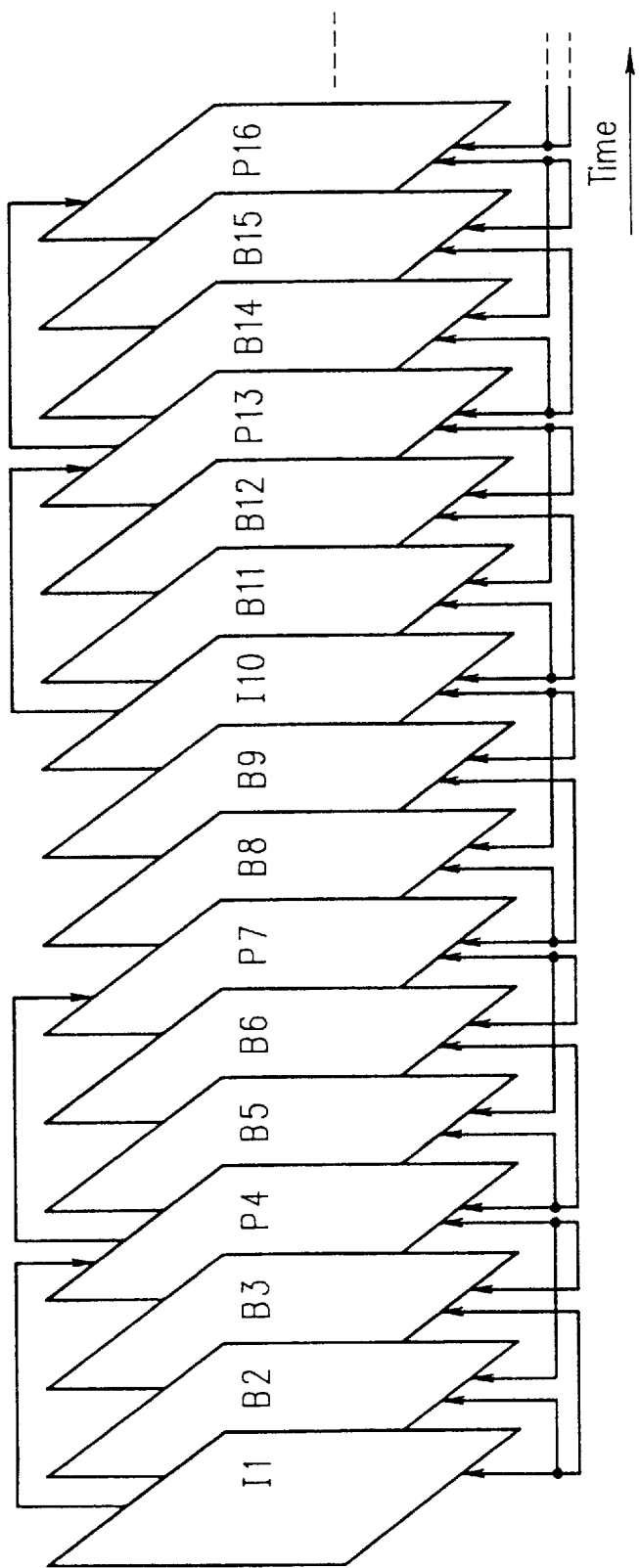
FIG. 24A shows a predictive structure for an inter-frame compression to be used for reproducing a video up to the MPEG standard.
Figure 24B:
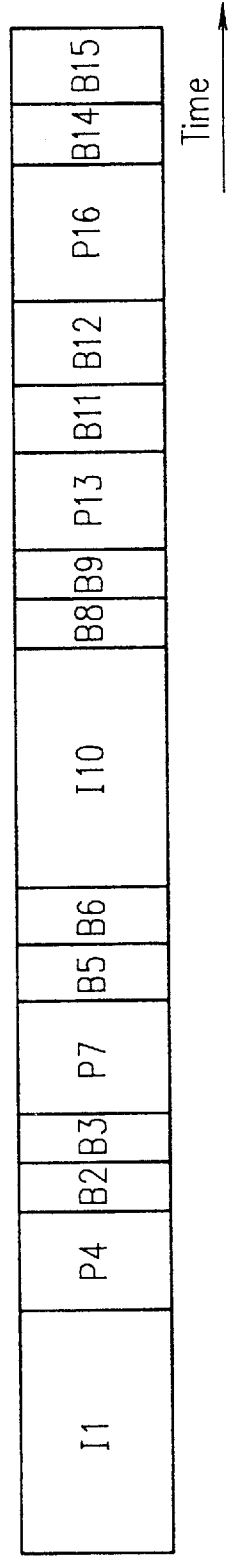
FIG. 24B shows a compressed transport stream arranged along a time axis.

FIG. 24A shows a predictive structure for an inter-frame compression to be used for reproducing a video following the MPEG standard. FIG. 24B shows a compressed transport streams arranged along a time axis. In FIG. 24B, "I" indicates a frame to be compressed by using only the data within a frame, i.e., a frame to be intra-frame coded; "P" indicates a frame to be compressed by calculating a difference between a current frame and a previous frame P or I, i.e., a frame to be predictively coded; and "B" indicates a frame to be compressed by calculating a difference between a current frame and a previous or subsequent frame I or P, i.e., a frame to be bidirectionally coded. The numeral n (an integer) added to each I, P and B denotes a number sequentially given to a frame in the forward direction of the time axis.

In order to improve the efficiency in the compression, the difference is calculated after performing a motion compensation in a practical processing. The video in the I-frames can be restored by using only the data in the I-frames. However, in order to decode the P-frames and the B-frames, a frame used as a basis during the compression (or the frame from which the difference is calculated) is required. As shown in FIG. 24B, in order to decode the B-frames, either the I-frames or the P-frames positioned on both sides of the B-frames along the time axis during the compression are required, so that the transport of the B-frames is delayed by two frame periods. In FIGS. 24A and 24B, bit streams for normal reproduction are shown.

Figure 25A:
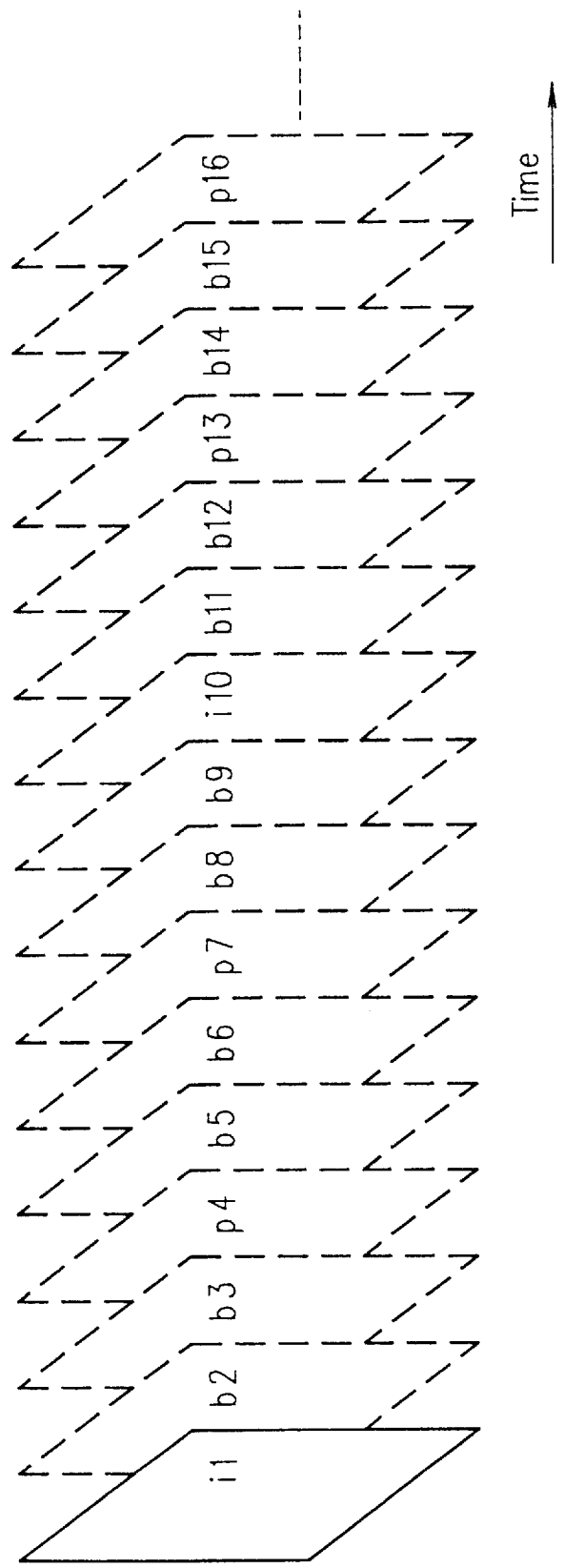
FIG. 25A shows frames to be used for a high-speed reproduction.
Figure 25B:
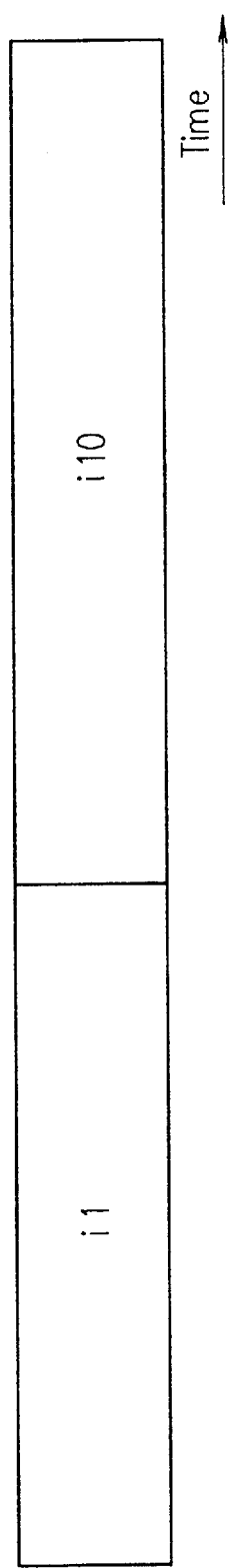
FIG. 25B shows transport streams arranged along a time axis.

FIG. 25A shows frames. FIG. 25B shows the transport streams for the high-speed reproduction arranged along the time axis. The transport streams for representing the frames excluding the P-frames and the B-frames are recorded as transport streams for the high-speed reproduction.

During the reproduction operation, the transporting speed of a tape-shaped recording medium is controlled to be predetermined speed by a speed controller, and a signal is reproduced by a reproducing head 9.

For example, in performing a normal reproduction, the same digital signal as the digital signal recorded by the recording head is reproduced by the reproducing head. A head having the same configuration as that of the recording head can be used as the reproducing head.

The reproduced digital signal is amplified by a reproducing amplifier in a predetermined manner, and then corrected by the ECC by using an error correction code added to the signal during the recording operation. Then, the corrected signal is divided into a data for a normal reproduction and a data for a high-speed reproduction by a divider, and subjected to an inverse processing by a reproducing signal processor. Thereafter, the necessary data is selected by a switch and then output to an output terminal. The switch is turned so that the data for a normal reproduction is output during the normal reproduction and that the data for the high-speed reproduction is output during the high-speed reproduction. In this way, a reproduced bit stream is output to the output terminal. When the bit stream is reproduced at a speed different from the normal speed, the head trace becomes different from the trace during the recording operation. It is assumed that all the necessary data is recorded so that the data can also be reproduced in such a case.

However, even if a high-speed reverse reproduction of the stream compressed and recorded by a combination of an inter-frame prediction and a motion compensation as shown in FIG. 24 is tried to be performed by such a conventional recording and reproducing apparatus, the streams including the P-frames and B-frames are reproduced in an inverse temporal order, so that the high-speed reverse reproduction is not realized satisfactorily.

In addition, a backward slow reproduction using the data for a normal reproduction cannot be performed, either.

Figure 26:
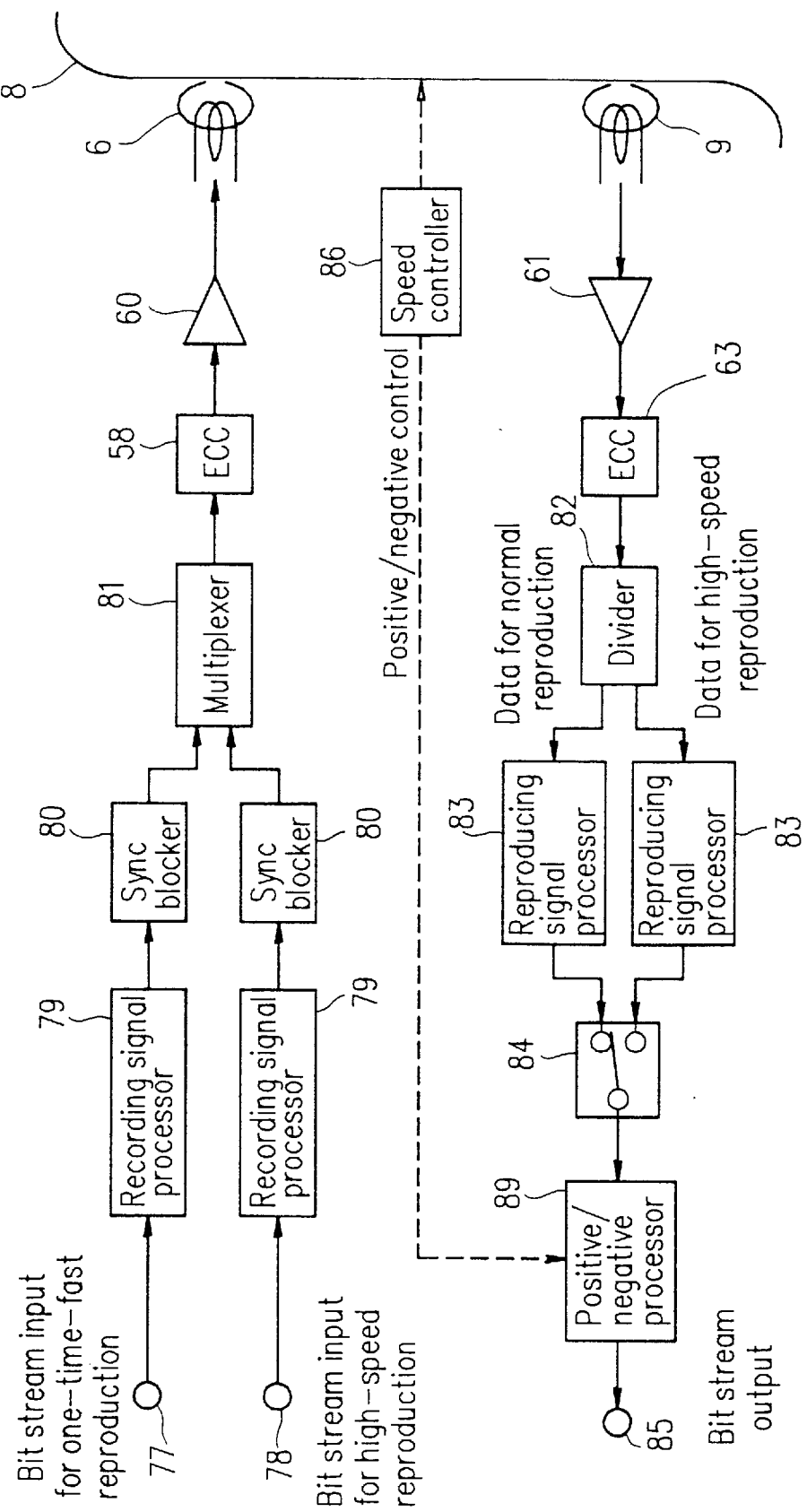
FIG. 26 is a block diagram schematically showing a configuration of a recording and reproducing apparatus according to a ninth example of the present invention.

FIG. 26 is a block diagram showing a configuration of a recording and reproducing apparatus according to a ninth example of the present invention.

Input terminals 77 and 78 receive a bit stream for a normal reproduction and a bit stream for a high-speed reproduction, respectively. The respective bit streams input from the input terminals 77 and 78 are processed by a recording signal processor 79 in a predetermined manner, and then divided into sync blocks, i.e., minimal units for recording and reproducing operations, by a sync blocker (hereinafter, simply referred to as an "B") 80. The respective streams divided into the sync blocks are time-axis multiplexed into one signal by a multiplexer 81, and then an error correction code is added to the signal by the ECC 58, so as to be a recording signal. The recording signal is appropriately amplified by a recording amplifier 60 and then recorded on a tape-shaped recording medium 8 by a recording head 6. During this recording operation, the speed for transporting the tape-shaped recording medium 8 is controlled to be normal speed by a speed controller 86.

The reproduced digital signal is amplified by a reproducing amplifier 61 in a predetermined manner, and then corrected by the ECC 63 by using an error correction code added to the signal during the recording operation. Then, the corrected signal is demultiplexed into a data for a normal reproduction and a data for a high-speed reproduction by a demultiplexer 82, and subjected to an inverse processing by a reproducing signal processor 83. Thereafter, the necessary data is selected by a switch 84 and then output to an output terminal 85. The switch 84 is turned so that the data for a normal reproduction is output during the normal reproduction and that the data for the high-speed reproduction is output during the high-speed reproduction. The output from the switch 84 is subjected to two different processings by a positive/negative processor 89 depending upon whether the speed is positive or negative. Here, when a term "positive speed" is used, the tape transport direction is the same as the direction used for normal play. A term "negative speed" is used, the tape transport direction is the opposite to the direction used for the normal play.

Figure 27:
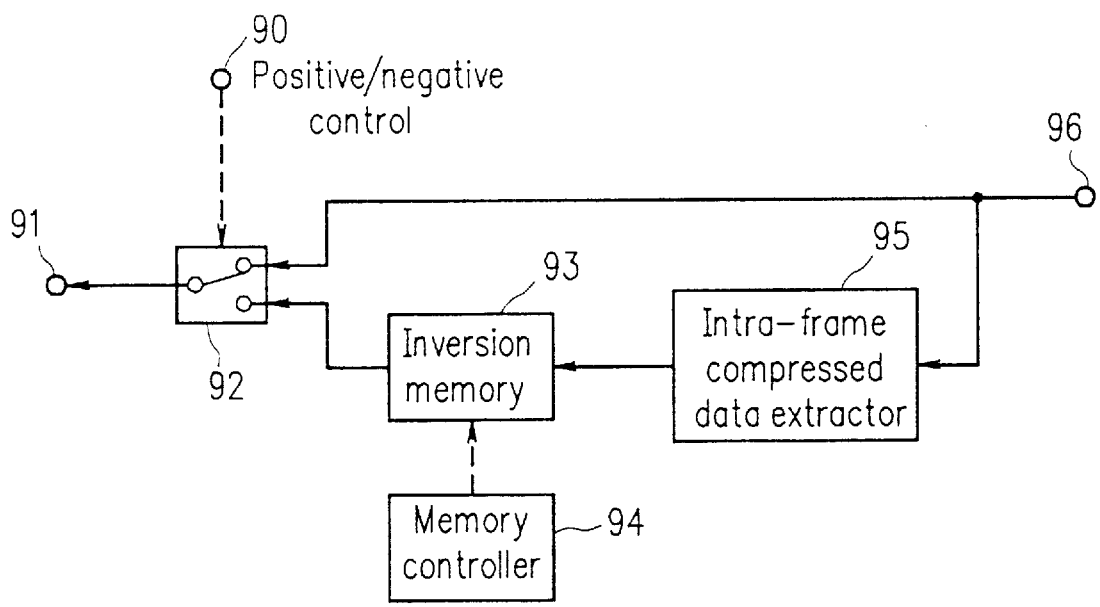
FIG. 27 is a block diagram schematically showing a configuration of a positive/negative processor for a recording and reproducing apparatus according to the ninth example of the present invention.

FIG. 27 is a block diagram showing a configuration of the positive/negative processor 89. A switch 92 is controlled by a signal input from a positive/negative control signal input terminal 90. When a tape is transported at a positive speed, the switch 92 is connected with the upper terminal shown in FIG. 27, and the bit stream input to a stream input terminal 96 is output without being processed.

On the other hand, when a tape is transported at a negative speed, the bit stream input from the stream input terminal 96 is output to an output terminal 91 through an intra-frame compressed data extractor 95, an inversion memory 93 and the switch 92. In this case, the bit stream input from the stream input terminal 96 is inverse of the stream during the recording operation in the transporting order of the frames. Accordingly, the P-frames and the B-frames compressed by a forward prediction or a bidirectional prediction cannot be restored. In other words, there is no use in transporting the information in the P-frames and the B-frames. Therefore, the intra-frame compressed data extractor 95 eliminates the P-frames and the B-frames from the frame data to be input, thereby converting the data into a stream consisting of only I-frames.

Since the temporal order of the stream consisting of only I-frames is still inverse within a frame, the temporal order within the frame is restored to a correct one by using the inversion memory 93. A memory controller 94 controls the inversion memory 93 so as to read the data stream in the inverse temporal order. In this way, a data where the order of the frames is inverse but the order of the data within the frames is correct is output to the output terminal 91. The data output from the output terminal 91 is then output to the output terminal 85 shown in FIG. 26. In this way, when the tape is transported at a negative reproduction speed, a video reproduced only by the I-frames can be obtained.

Consequently, whether the tape is transported at a positive speed or at a negative speed, the bit stream is output to the output terminal 85 in the order during the recording operation. When the video is reproduced at a speed different from the normal speed, the head trace becomes different from that during the recording operation. However, it is assumed that all the necessary data is recorded so that the data can also be reproduced in such a case.

Figure 28:
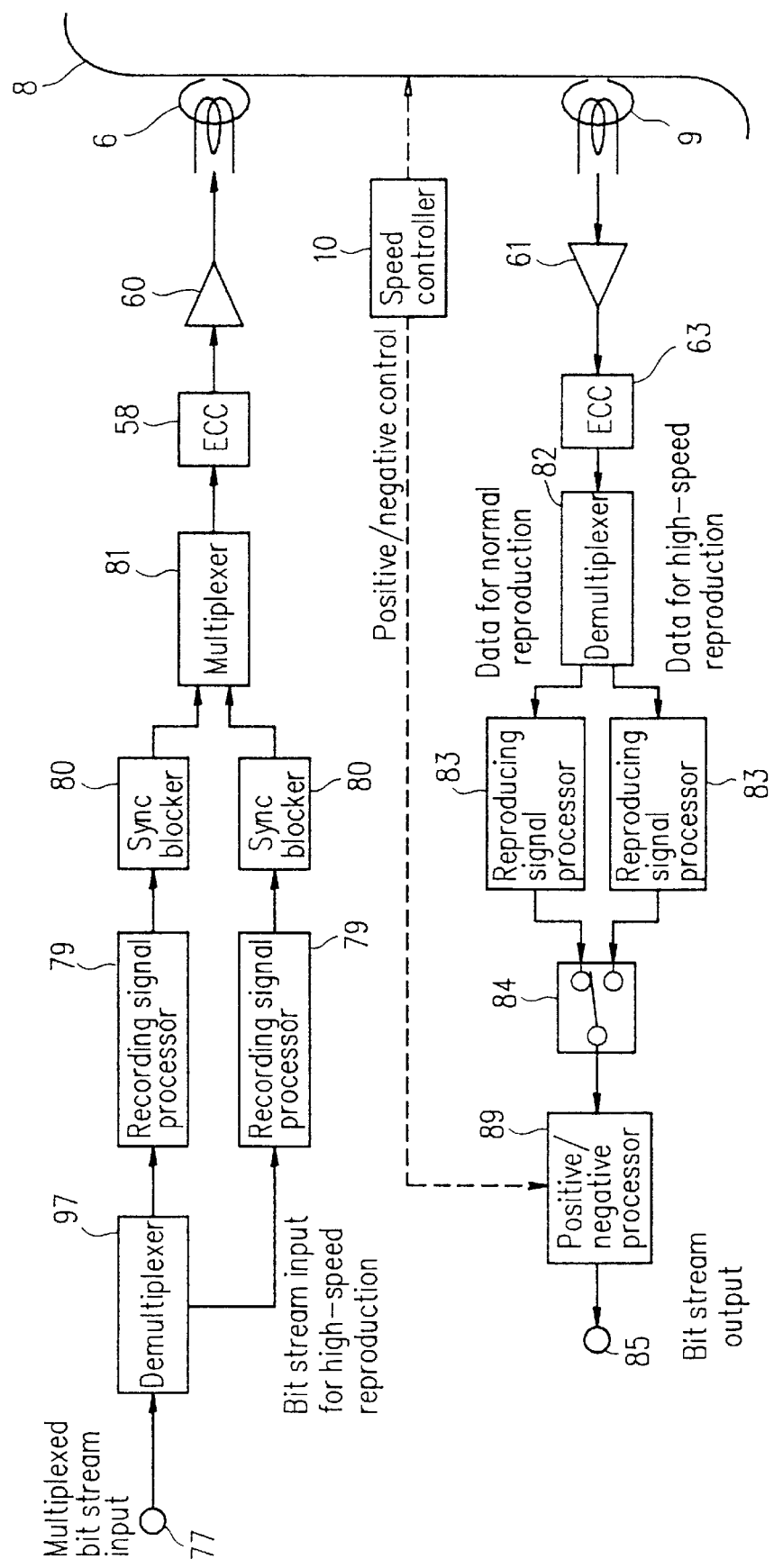
FIG. 28 is a block diagram schematically showing a configuration of a modified recording and reproducing apparatus according to the ninth example of the present invention.

FIG. 28 is a block diagram showing a modified configuration of a recording and reproducing apparatus according to this ninth example. As shown in FIG. 28, the bit stream for a normal reproduction and the bit stream for a high-speed reproduction are multiplexed and input to a single input terminal 77 during the recording operation. In the case where the demultiplexer 97 can divide the two kinds of input bit streams, the number of the input terminal may be one.

It is noted that the bit stream for a high-speed reproduction is not necessarily required to include all the kinds of frames of I, P and B, and that the stream may consist of only I-frames.

The ninth example of the present invention has been described as being applied to a recording and reproducing apparatus. However, the present invention is applicable to a recording apparatus only or a reproducing apparatus only.

The tape pattern is not limited to the patterns described in this example, but may be any pattern so long as a necessary data can be reproduced during a variable speed reproduction. For example, the data for a high-speed reproduction can be arranged along the head trace, or the data can be arranged on the tracks intermittently selected.

Conventionally, it has been impossible to reproduce the inter-frame compressed bit stream at a positive or a negative speed by using a single apparatus. As is apparent from the foregoing description, the recording and reproducing apparatus according to the ninth example of the present invention can restore the order of the data during the recording operation by extracting only the intra-frame compressed data and changing the temporal order within the frame even when a reverse reproduction is performed. As a result, the inter-frame compressed bit stream can be reproduced at a positive speed or a negative speed by using a single apparatus.

As described above, according to a recording and reproducing apparatus of the present invention, even if the bit rate is varied, the data can be processed in a constant state by changing the number of the recording and reproducing channels to be used without varying the operational frequency of the respective recording and reproducing channels or the rotation speed of the cylinder.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording and reproducing apparatus for an input encoded data stream having two different bit rates of $N_1$ and $N_2$ (where $N_1<N_2$), comprising:
    an input interface having two outputs for outputting the input encoded data stream to two channels, the input interface dividing and outputting the input encoded data stream to both of the two channels when the bit rate of the input encoded data stream is $N_2$, while the input interface outputting the input encoded data stream to only one of the two channels when the bit rate of the input encoded data stream is $N_1$;
    a first recording processor and a second recording processor for converting the input encoded data stream into a signal suitable for being recorded so as to supply the signal to a recording head for writing the signal onto a magnetic tape, the first recording processor and the second recording processor being connected with the two outputs of the input interface;
    a tape speed controller for varying a speed for transporting the magnetic tape in accordance with the bit rates of the input encoded data stream;
    a reproducing head for reading the signal from the magnetic tape;
    a first reproducing processor and a second reproducing processor for performing a predetermined reproduction processing for a signal reproduced from the reproducing head; and
    an output interface having two inputs for inputting the signals from two channels, the input interface integrating and outputting the signals input from the two channels when the bit rate of the reproduced encoded data stream is $N_2$, while the output interface outputting the signal input from only one of the two channels when the bit rate of the reproduced encoded data stream is $N_1$,
    wherein the speed for transporting the magnetic tape and a number of the channels used for recording and reproducing operations are varied in accordance with the bit rates of the input encoded data stream.

2. A recording and reproducing apparatus for an encoded data stream according to claim 1, comprising:
    an input terminal for inputting an analog video signal;
    an output terminal for outputting the analog video signal;
    an analog recording processor for processing the analog video signal so as to record the analog video signal onto the magnetic tape; and
    an analog reproducing processor for processing the analog video signal so as to reproduce the analog video signal from the magnetic tape,
    wherein a rotation speed of a cylinder, on which the recording head and the reproducing head are mounted, is not varied in both cases of recording the analog video signal and the encoded data stream.

3. An error correction apparatus for a recording and reproducing apparatus for an encoded data stream according to claim 1,
wherein the recording and reproducing apparatus or the reproducing apparatus comprises:
    an error detection means for detecting an error from a reproduced signal and outputting error detection information when the error is detected;
    a refresh information detection means for outputting a refresh information signal indicating a timing of a refresh performed in a differential pulse coding from a reproduced signal; and
    a correction means for generating a signal in a refresh period during which no error is generated from the reproduced signal by using a signal output from the error detection means and the signal output from the refresh information detection means so as to substitute the signal in the refresh period during which no error is generated for the signal in a refresh period during which the error is generated.

4. An error correction apparatus according to claim 3, wherein the recording and reproducing apparatus or the reproducing apparatus further comprises:
    a memory means for storing the reproduced signal; and
    a controller for controlling the memory means so that a signal in a refresh period during which no error is generated is output in place of the signal in a refresh period during which an error is generated, by using the output from the error detection means and the output from the refresh information detection means.

5. An error correction apparatus according to claim 3, wherein the recording and reproducing apparatus or the reproducing apparatus further comprises:
    a data bit number converter for converting a bit number of the signal in a refresh period during which no error is generated into a bit number of the signal in a refresh period during which an error is generated, by using the signal output from the memory means as an input.

6. A recording and reproducing apparatus for an input encoded data stream having two different bit rates of $N_1$ and $N_2$ (where $N_1<N_2$), comprising:
    an input interface for detecting the bit rate of the input encoded data stream;
    a recording processor for converting the input encoded data stream into a signal suitable for being recorded so as to supply the signal to a recording head for writing the signal onto a magnetic tape, the recording processor being connected with an output of the input interface;
    a tape speed controller for varying a speed for transporting the magnetic tape in accordance with the bit rates of the input encoded data stream;
    a cylinder controller for varying a rotation speed of a cylinder in accordance with the bit rates of the input encoded data stream;
    a reproducing head for reading the signal from the magnetic tape;
    a reproducing processor for performing a predetermined reproduction processing for a signal reproduced from the reproducing head; and
    an output interface for outputting a signal so as to restore the input encoded data stream from the signal,
    wherein the speed for transporting the magnetic tape and the rotation speed of the cylinder are varied in accordance with the bit rates of the input encoded data stream.

* * * * *